(12) United States Patent
Bhandarkar

(10) Patent No.: US 12,444,985 B2
(45) Date of Patent: Oct. 14, 2025

(54) APPARATUS AND METHOD FOR PERTURBATION OF OPERATING POINT FOR PREVENTION OF WIRELESS POWER TRANSFER STALLING

(71) Applicant: Microchip Technology Incorporated, Chandler, AZ (US)

(72) Inventor: Santosh Bhandarkar, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/498,272

(22) Filed: Oct. 31, 2023

(65) Prior Publication Data

US 2024/0146111 A1 May 2, 2024

Related U.S. Application Data

(60) Provisional application No. 63/381,712, filed on Oct. 31, 2022.

(51) Int. Cl.
*H02J 50/00* (2016.01)
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC .............. H02J 50/80; H04B 5/72; H04B 5/79
See application file for complete search history.

(56) References Cited

U.S. PATENT DOCUMENTS

| | | | |
|---|---|---|---|
| 11,070,091 B2 | 7/2021 | Bhandarkar et al. | |
| 11,223,232 B2 | 1/2022 | Bhandarkar et al. | |
| 11,637,450 B2 | 4/2023 | Bhandarkar et al. | |
| 2016/0150584 A1* | 5/2016 | Ohta ................. | H04W 52/0216 370/328 |
| 2016/0372956 A1 | 12/2016 | Jung et al. | |
| 2018/0219419 A1 | 8/2018 | Ettes et al. | |
| 2019/0173199 A1* | 6/2019 | Takei .................. | H01Q 21/245 |
| 2022/0006482 A1* | 1/2022 | He ......................... | H04L 69/22 |
| 2022/0337093 A1 | 10/2022 | Draak et al. | |
| 2023/0006473 A1 | 1/2023 | Gao et al. | |

(Continued)

OTHER PUBLICATIONS

Qi Specification, Wireless Power Consortium, Inc., Jan. 2021, Version 1.3, 746 pages.

(Continued)

*Primary Examiner* — Adi Amrany
(74) *Attorney, Agent, or Firm* — TraskBritt

(57) ABSTRACT

In one or more examples, an apparatus may comprise a wireless power transmitter. The apparatus may include transmitter circuitry including a transmit coil to inductively couple with a receive coil of a wireless power receiver. The apparatus may further include a controller to control the transmitter circuitry to generate a wireless power signal in the transmit coil; perform demodulation on a communication signal, modulated over the wireless power signal, in attempt to decode one or more packets from the wireless power receiver; and perturb an operating point of the transmitter circuitry responsive to identifying a failure in decoding the one or more packets.

22 Claims, 17 Drawing Sheets

(56) References Cited

U.S. PATENT DOCUMENTS

2023/0063671 A1\* 3/2023 Song ...................... H04L 27/04
2023/0238831 A1\* 7/2023 Choi ...................... H01F 38/14
307/104

OTHER PUBLICATIONS

Rice, Examining Wireless Power Transfer, Texas Instruments Power Supply Design Seminar SEM2100, 2014, 24 pages.
International Search Report of International Application No. PCT/US2023/036448, mailed Feb. 27, 2024, 5 pages.
Written Opinion of the International Searching Authority of International Application No. PCT/US2023/036448, mailed Feb. 27, 2024, 9 pages.

\* cited by examiner

APPARATUS AND METHOD FOR PERTURBATION OF OPERATING POINT FOR PREVENTION OF WIRELESS POWER TRANSFER STALLING

CROSS-REFERENCE TO RELATED APPLICATION

This application claims the benefit under 35 U.S.C. § 119(e) of U.S. Provisional Patent Application Ser. No. 63/381,712, filed Oct. 31, 2022, the disclosure of which is hereby incorporated herein in its entirety by this reference.

FIELD

This disclosure relates generally to wireless power systems for wireless power transfer, and more particularly to perturbing an operating point of a wireless power transmitter to demodulate communications from a wireless power receiver for prevention of wireless power transfer stalling. Additionally, apparatuses and methods are disclosed.

BACKGROUND

During transfer of wireless power from a wireless power transmitter ("transmitter") to a wireless power receiver ("receiver"), the transmitter may fail to correctly demodulate communications received from the receiver over the wireless power signal used for the wireless power transfer. For example, at certain specific alignments of a receive coil of the receiver relative to a transmit coil of the transmitter, communications from the receiver to the transmitter may fail to be correctly demodulated. Failure to correctly demodulate communications from the receiver may lead to a communication timeout, and repeated failures to communicate may lead to a repeating cycle of stalling of wireless power transfer.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
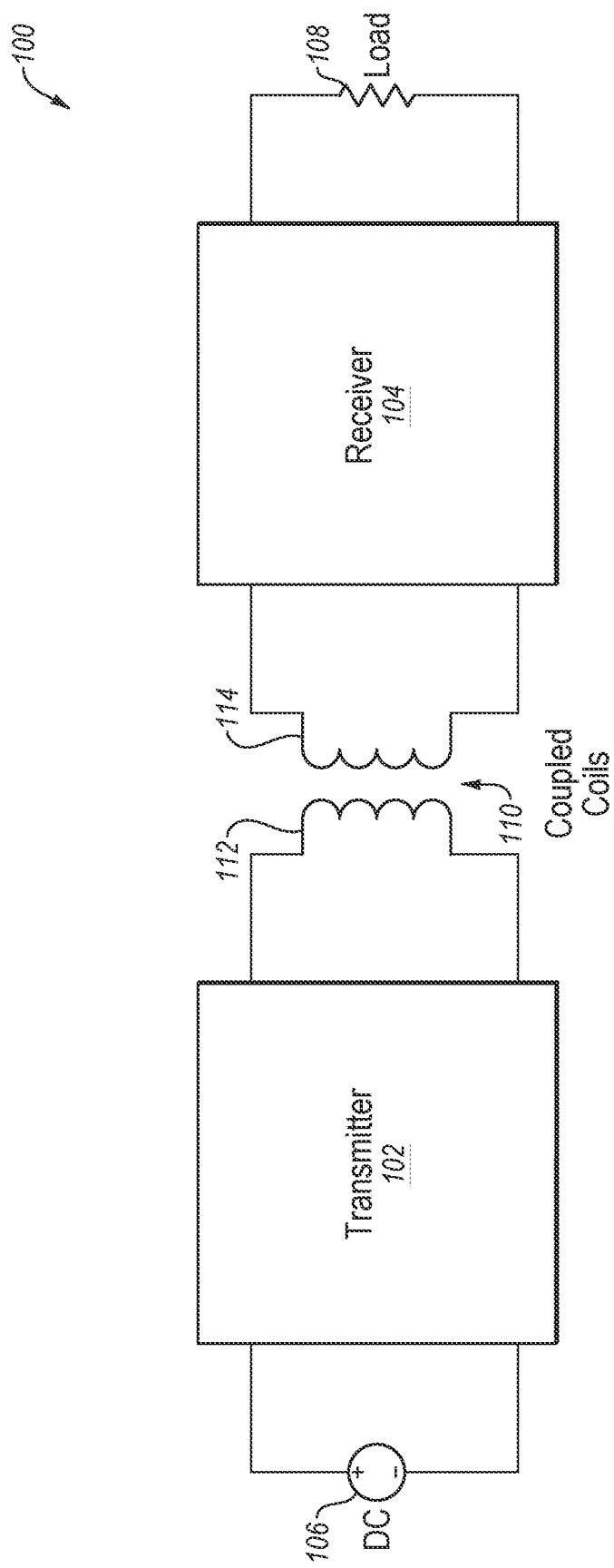
FIG. 1 is a block diagram of a wireless power system including a transmitter and a receiver, according to one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is programmed to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Wireless power transfer techniques are used to transfer power from one system to another in a wide range of applications. Qi is a wireless charging standard that is a widely-adopted standard that has proliferated into consumer cellular telephone applications.

By way of example, a Qi wireless system includes a wireless power transmitter ("transmitter") and a wireless power receiver ("receiver"). The transmitter controls the power transferred to the receiver based on feedback received from the receiver. The receiver communicates this feedback to the transmitter by sending an eight (8) bit signed integer that represents a control error (CE) value. The transmitter increases or decreases the power level to the receiver, using a coil current amplitude as a reference, based on the error value. This may be repeated one or more times in a wireless power system control loop for eventually reducing the control error to zero.

Communication from the receiver to the transmitter is performed in-band by altering electrical load characteristics at the receiver. The receiver causes changes in these characteristics using, for example, a switching resistance or a switching capacitance. The change in the capacitance or resistance at the receiver causes a change in the coil voltage or coil current at the transmitter. The rate of change is typically between 1 kilohertz (kHz) to 2 kHz. At the transmitter, the changes appear as a bit stream riding over a fundamental frequency of the power signal used for power transfer. The frequency used for power transfer may vary, for example, from 110 kHz to 148 kHz.

The changes in modulation amplitude observed at the transmitter depend on the alignment of the receiver coil with the transmitter coil, as well as the input voltage, load conditions, and other factors. To add to the complexity, the transmitter is expected to interface with different type of receivers having widely varying electrical characteristics. The changes in modulation amplitude may be on the order of a few millivolts (mV) or milliamps (mA) to hundreds of millivolts or milliamps.

One particular challenge at the transmitter is to extract the demodulated signal when the transmitter and the receiver are misaligned. In the misaligned condition, the signals at the transmitter have a meagre amplitude and are significantly distorted. In particular, one predominant issue is the presence of "dead spots" associated with the interface (i.e., the x-y plane) between the transmitter and the receiver. At dead spot locations, the change in the modulation amplitude is so small that, despite having three (3) different parameters to demodulate the signal, a reliable signal cannot be detected in order to correctly decode the message (e.g., the message containing the control error value for controlling the power level).

Due to the above, the transmitter is not able to receive the next control error value to regulate the operating point or reduce the control error to zero. Such a failure generally results in a timing out of the packets and a restarting of the protocol by the transmitter. Since the relative position of the transmitter and the receiver does not change, the protocol will eventually lead to the same end (e.g., the dead spot). Thus, the cycle continues and results in a non-transfer of power to the receiver, even when the receiver is placed over the transmitter for a relatively long period of time.

The inventor of this disclosure has identified the above-described "dead spot" issue and the benefit of substantially reducing or preventing such dead spots in communication between the receiver and the transmitter, as these dead spots ultimately lead to a shutdown of power transferred to the receiver or a power transfer stall. As used herein, the term "power transfer stall," or "power stalling," refer to a timeout of power transfer from a transmitter due to failure to properly demodulate or decode a message received from the receiver.

Various examples of the disclosure include perturbing the operating point of the transmitter to set it outside of the dead zone, to thereby ensure effective power level control for wireless power transfer. In one or more examples, the transmitter monitors or tracks demodulation status by observing a packet good signal (e.g., the incoming packet has been successfully demodulated and decoded). When demodulation is unsuccessful over a period of time (e.g., across all demodulation channels), the transmitter identifies the current operating point and adds a dither signal to the operating point (e.g., perturbing the operating point).

In one or more examples, the dither signal may be a change in frequency, duty-cycle, phase, rail voltage potential, or other. In one or more examples, a random distribution of values or a triangular pattern of values may be utilized to change the operating point as described herein. Those of ordinary skill in the art will appreciate various ways in which to change the operating point of the transmitter.

In one or more examples, the receiver uses amplitude shift keying (ASK) to modulate messages to the transmitter on the wireless power signal used for wireless power transfer. In this way, the receiver may provide feedback to the transmitter to raise or lower the power level (e.g., using the control error value) of the wireless power signal. The transmitter acts on the feedback from the receiver based at least in part on a fixed reference. In instances where the transmitter is unable to demodulate the signal from the receiver, one or more examples disclosed herein are used to detect demodulation failure and perturb an operating point to facilitate proper communication. The control loop stabilizes once communication starts, so that wireless power transfer may be ensured.

In one or more specific examples, a receiver may send communication packets (e.g., using ASK, from 1-2 kHz) to a transmitter. The transmitter demodulates the communication signal based, at least in part, on a coil voltage potential of the transmit coil, a coil current of the transmit coil, or an input current provided by a power supply to the transmitter. The transmitter uses a control error value received from the receiver to change the power delivered to the receiver. At certain points in x, y, z coordinates, the transmitter is unable to demodulate, which thereby stalls power transfer. The transmitter may check for demodulation failure for a certain duration of time before the communication timeout period. The transmitter may generate an array of changes in the operating point based, at least in part, on the operating mode when the minimum time has elapsed after demodulation failure. The transmitter detects the present operating mode and an actual operating point. The transmitter perturbs the operating point by adding a predetermined component stored in an array. Change in the operating point changes the characteristics of the reflected signal at the transmitter. The transmitter demodulates the control error and the control loop brings the operating point back to normal.

An MP-A22 transmission coil was tested using frequency for control from 110 kHz to 148 kHz in a frequency mode of operation. When the frequency reached 148 kHz, the mode changed to a duty-cycle mode of operation where the duty-cycle varied from 50% to 10%. Dead spots were observed in both the frequency and the duty-cycle mode, and especially during a calibration phase of the receiver when the load transitioned from full load to actual load. With use of various examples of the disclosure, it was observed that the control error quickly converged to zero and power was transferred continuously, thereby circumventing wireless power transfer stalling. Without use of the examples disclosed herein, a conventional transmitter would restart power transfer and end up in the same dead spot.

Various examples disclosed herein may be implemented using software or firmware executed by a microcontroller without adding any (or few) additional hardware components. By way of non-limiting example, an existing microcontroller of the transmitter is used to implement most or all of the functionality according to examples disclosed herein. Accordingly, relatively few other components may be added to a conventional transmitter, as examples disclosed herein may be implemented using software or firmware executed by the microcontroller. In one or more other examples, power transfer stall, or equivalently "power stalling," may be prevented using simple hardware on a circuit board, and/or based at least in part on coil voltage/current, input current, or combinations thereof. In one or more examples, power transfer from the transmitter to the receiver may be at least substantially guaranteed regardless of conditions of load and input voltage potential and regardless of the type of receiver.

Various examples herein may be used in wireless power transmitters. Other applications where examples disclosed herein may be used include, for example, using transmitter-receiver pair and communication for control.

FIG. 1 is a block diagram of a wireless power system 100, according to one or more examples. Wireless power system 100 includes a transmitter 102 and a receiver 104. Transmitter 102 is powered by a direct current (DC) voltage source 106, while receiver 104 is connected to a load 108. Power is transferred from transmitter 102 to receiver 104 through a set of coupled coils 110 including a transmit coil 112 of transmitter 102 and a receive coil 114 of receiver 104. Power transmission is efficient when coupled coils 110 are placed one over the other and are aligned. There may be no physical connection between transmitter 102 the receiver 104. Transmitter 102 controls the power transferred to receiver 104 by controlling the input voltage, frequency, phase, and/or duty-cycle of a signal applied to transmit coil 112.

Figure 2:
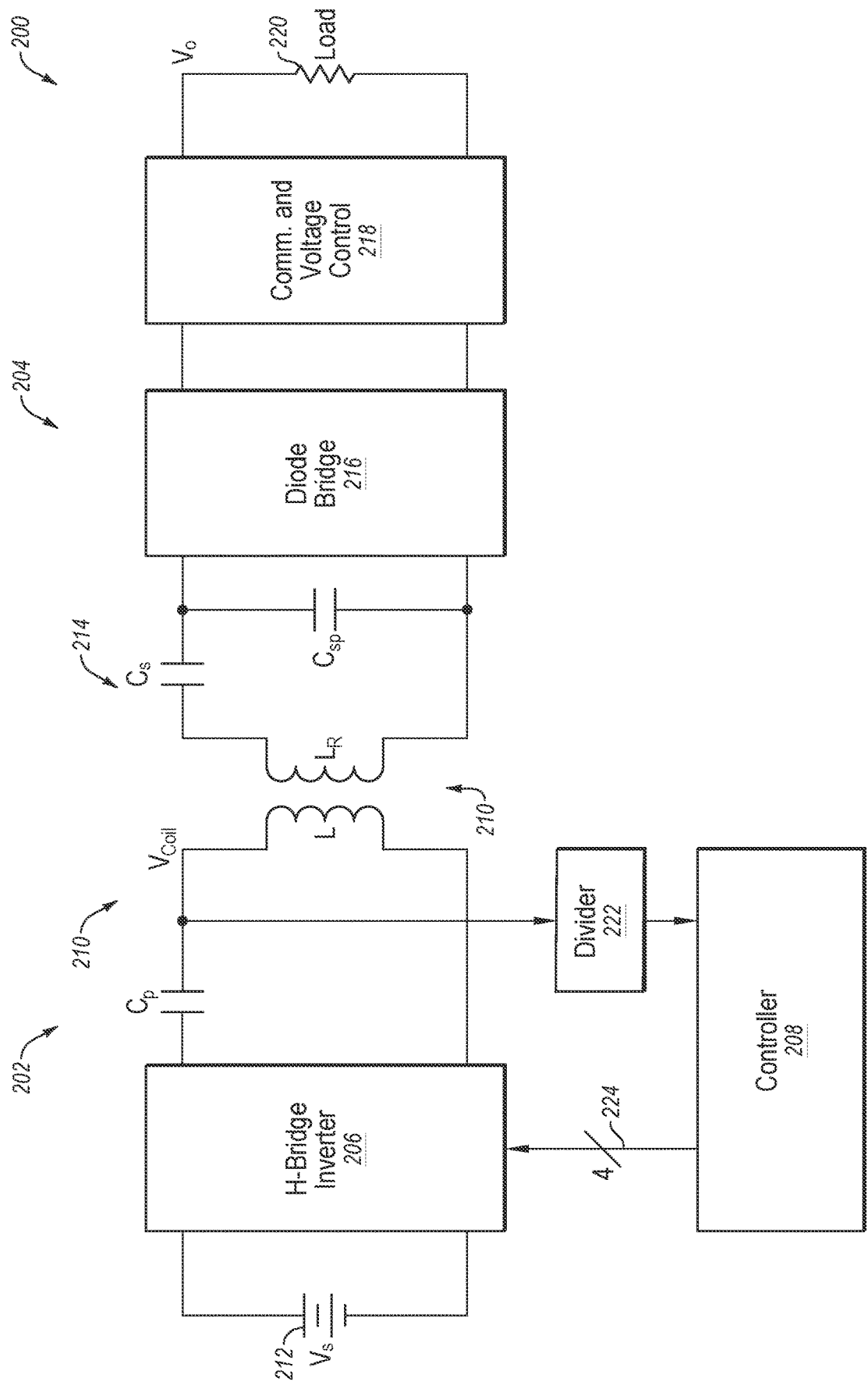
FIG. 2 is a block diagram of a wireless power system, which is an example of the wireless power system of FIG. 1.

FIG. 2 is a block diagram of a wireless power system 200, which is an example of wireless power system 100 of FIG. 1. Wireless power system 200 includes a transmitter 202 and a receiver 204. Transmitter 202 comprises transmitter circuitry including an H-bridge inverter 206 which is controlled a controller, or more specifically, a microcontroller 208 (e.g., a dsPIC microcontroller, without limitation). In one or more examples, H-bridge inverter 206 may be a metal oxide semiconductor field effect transistor (MOSFET) H-bridge inverter including MOSFET switches. The transmitter circuitry of transmitter 202 also includes a resonant tank circuit 210, including a capacitor C p and a transmit coil L, connected across an output of H-bridge inverter 206. An input to H-bridge inverter 206 may come directly from DC voltage source 106, as illustrated in FIG. 2, or alternatively from an output of a four-switch buck boost converter (FSBBC), which controls the input voltage Vs to H-bridge inverter 206.

Receiver 204 includes a resonant tank circuit 214 formed by a receive coil L R and capacitors $C_s$ and $C_{sp}$. An output of resonant tank circuit 214 is passed through a diode bridge rectifier 216, which rectifies a voltage received by diode bridge rectifier 216. An output of diode bridge rectifier 216 is passed through communication and voltage control circuitry 218, which provides a fixed voltage $V_O$ at an output load 220. Communication and voltage control circuitry 218 may include, by way of non-limiting example, either a buck converter or a low dropout voltage regulator (LDO). The communication circuits may be placed either at an output of receiver 104 (e.g., resistive) or across an input of the receiver 104 (e.g., capacitive).

Microcontroller 208 measures a coil voltage potential $V_{coil}$ across the transmit coil L at, by way of non-limiting example, through a divider circuit 222. Divider circuit 222 may provide a measurement voltage potential that is proportional to the coil voltage potential $V_{coil}$ to an input terminal of microcontroller 208 (e.g., an input terminal of an analog to digital converter (ADC) of microcontroller 208, without limitation). Microcontroller 208 may sample the measurement voltage potential (e.g., using an ADC, without limitation).

There are several ways to control the power transmitted to receiver 204. In one or more examples of FIG. 2, the frequency or the duty-cycle or the phase of H-bridge inverter 206 may be varied by microcontroller 208 via pulse width modulation (PWM) signals 224 provided to H-bridge inverter 206 to control the power transferred. In one or more other examples, a voltage potential at an input of resonant tank circuit 210 may be controlled to control the power transferred. Here, an additional power stage between input DC voltage source 212 and H-bridge inverter 206 may be utilized. This alternative may result in fixed frequency operation. In one or more examples, a frequency for MP-A9 or MP-A13 type transmitters with voltage control has a fixed frequency of 120 kilohertz (kHz).

In other example topologies, such as MP-A22, the frequency varies, and may vary from 110 kHz to 148 kHz. The input voltage potential Vs provided to H-bridge inverter 206 may be constant or varying depending on the type of receiver. For MP-A22, the input voltage Vs is fed from the output of the USB power delivery (USBPD) device. With five (5) watt (W) baseline power profile (BPP) receivers, the USBPD voltage is set to 5 volts (V), while for fifteen (15) W extended power profile (EPP) receivers, the USBPD voltage is set to nine (9) V. Responsive to the frequency reaching an upper limit of 148 kHz, the control mode changes to duty-cycle control from frequency control. The duty-cycle is varied at fixed frequency and maintained between 10% and 50%.

Figure 3:
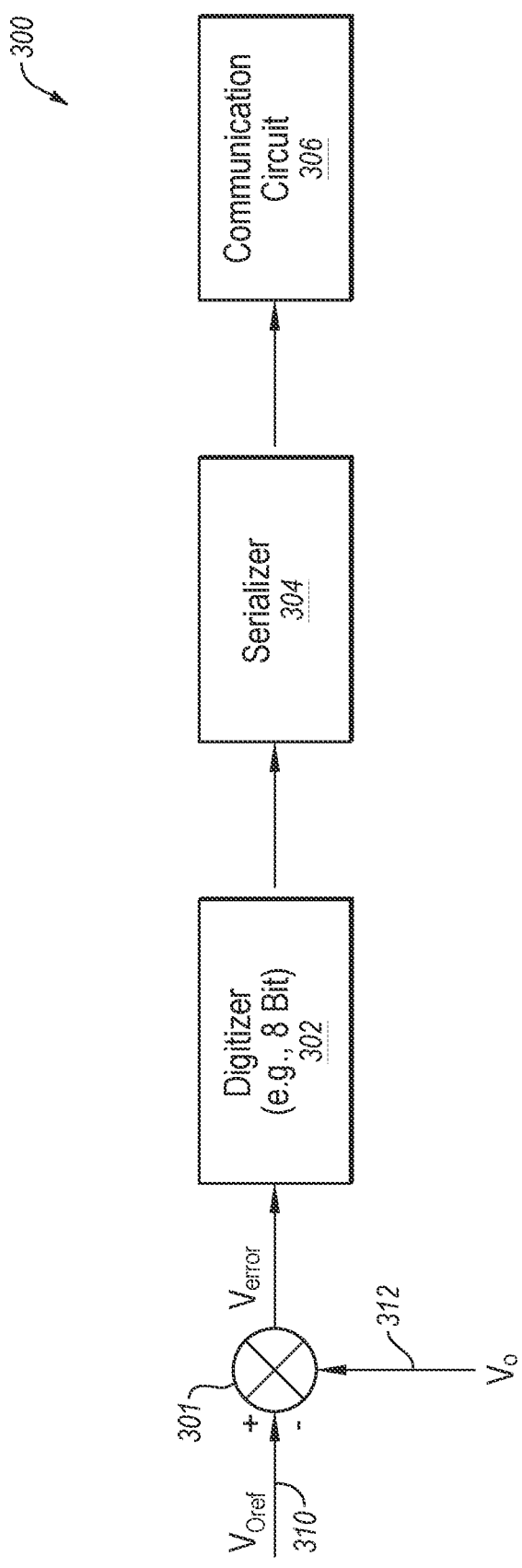
FIG. 3 is a block diagram of a receiver control process of a wireless power system control loop for controlling power level to the receiver, according to one or more examples.
Figure 4:
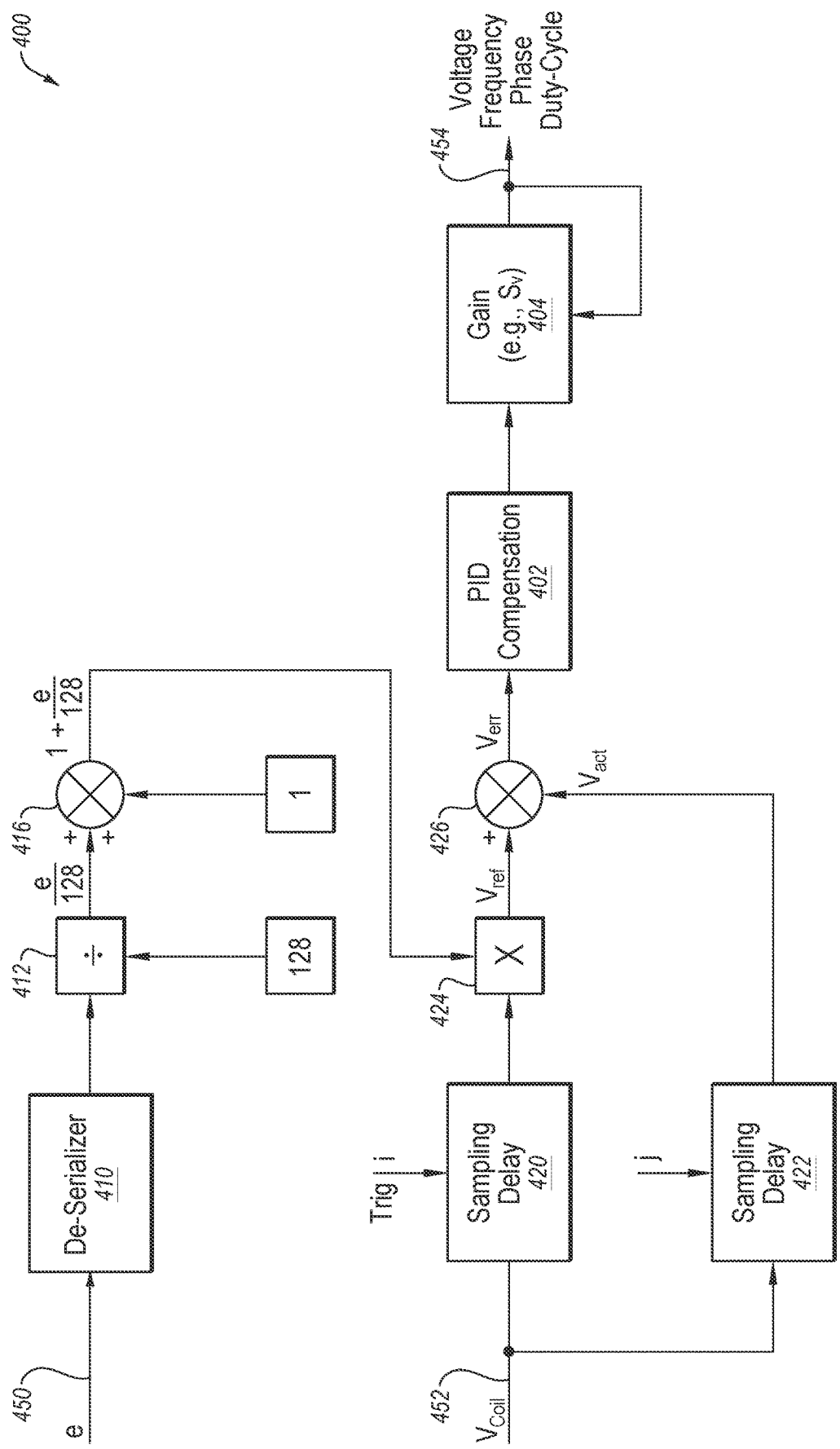
FIG. 4 is a block diagram of a transmitter control process of the wireless power system control loop for controlling power level to the receiver, according to one or more examples.

FIGS. 3 and 4 are block diagrams of receiver and transmitter control processes, respectively, of a wireless power system control loop for controlling power level to a receiver, according to one or more examples.

In particular, FIG. 3 is a block diagram of a receiver control process 300 of a receiver, according to one or more examples. In one or more examples, receiver control process 300 may be implemented by receiver 104 of FIG. 1 and/or receiver 204 of FIG. 2. In one or more examples, one or more modules shown in receiver control process 300 may be implemented as one or more processes of the receiver (e.g., in a controller).

Receiver control process 300 includes (e.g., processes associated with) a comparator 301, a digitizer 302, a serializer 304, and a communication circuit 306. Comparator 301 compares an output voltage $V_O$ at an input 312 with a reference voltage potential $V_{Oref}$ at an input 310. The output voltage $V_O$ may be, or be based on (e.g., proportional to), the output of diode bridge rectifier 216 or communication and voltage control circuitry 218 of FIG. 2. Comparator 301 generates a difference or error V error between the output $V_O$ and the reference voltage potential $V_{Oref}$. The error $V_{error}$ is converted into a signed (i.e., + or —) 8-bit integer number using digitizer 302. The number is serialized at serializer 304 and communicated by communication circuit 306 to the transmitter. With reference to FIG. 2, for example, communication circuit 306 may transmit a message having the number across coupled coils 110 (i.e., the receive coil $L_R$ and the transmit coil L) to transmitter 202. The message may be communicated over the fundamental frequency of the power signal used for power transfer.

FIG. 4 is a block diagram of a transmitter control process 400 of a transmitter according to one or more examples. In one or more examples, transmitter control process 400 may be implemented by transmitter 102 of FIG. 1 and/or transmitter 202 of FIG. 2. In one or more examples, one or more modules shown in transmitter control process 400 may be implemented as one or more processes of the transmitter (e.g., in a controller).

The transmitter may include a demodulation circuit (e.g., a resistive or a capacitive demodulation circuit) to demodulate the signal to decode the message having the number. The number is de-serialized at a de-serializer 410 to produce an 8-bit error packet "e." The error packet e may have a value from +127 to −128. The error value is received at an input 450 and divided by 128 using a divider 412. The quotient at the output of divider 412 is added to one (1) by an adder 416 to produce an adjusted error value (e.g., 1+e/128).

A coil voltage amplitude $V_{coil}$ received at an input 452 is sampled by a sampling delay 420 (e.g., at instants i) at a time before the arrival of the packet. The coil voltage amplitude $V_{coil}$ is multiplied, by a multiplier 424, with the adjusted error value (e.g., from the output of adder 416) to generate a reference voltage potential $V_{ref}$. The coil voltage amplitude $V_{coil}$ is sampled by a sampling delay 422 (e.g., at instants j) to generate an actual error voltage potential $V_{act}$. In one or more examples, the value of j may vary from 1 to 20 for every control error packet (CEP) received. The reference voltage potential $V_{ref}$ is compared with the coil voltage amplitude $V_{coil}$ by a comparator 426 to produce an error voltage potential $V_{err}$.

The error voltage potential $V_{err}$ is passed through a proportional-integral-derivative (PID) 402, and its output is scaled by a constant $S_v$ at a gain function 404. In one or more examples, the value of $S_v$ depends on the primary control parameter of the transmitter (e.g., voltage or frequency, without limitation). An output 454 of gain function 404 provides a new value of the control variable (e.g., one or more of voltage, frequency, phase, or duty-cycle, without limitation). The new value of output 454 drives power into the transmitter coil and to the receiver coil of the receiver (e.g., receiver 104 of FIG. 1 or receiver 204 of FIG. 2, without limitation).

Figure 5:
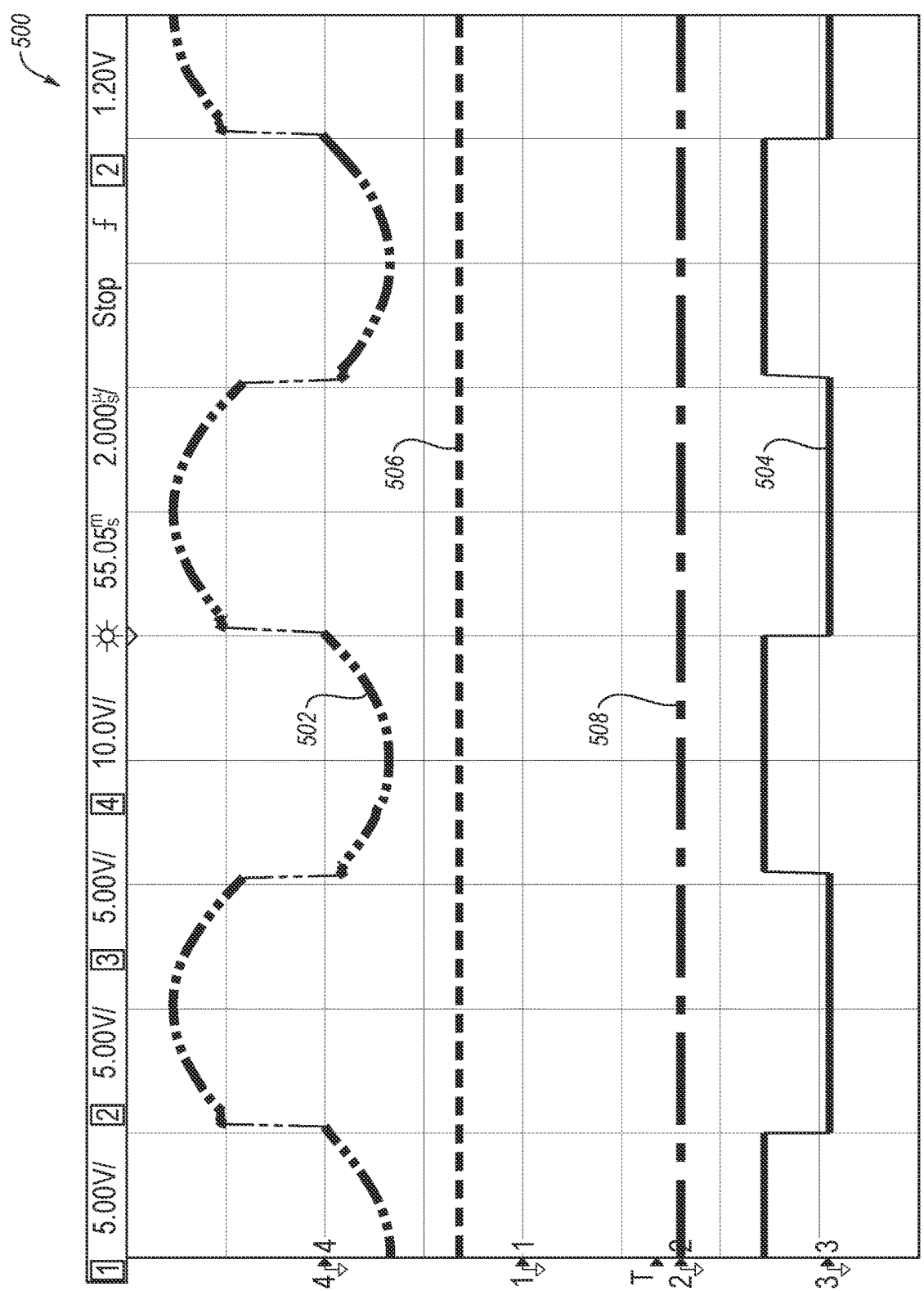
FIG. 5 is a plot of example waveforms of a transmitter without an output load at the receiver, according to one or more examples.

FIG. 5 is a plot of waveforms 500 of a transmitter, according to one or more examples. In particular, waveforms 500 may be waveforms of transmitter 202 of FIG. 2, where receiver 204 is without output load 220. Waveforms 500 include a coil voltage potential plot 502 of a coil voltage potential, a PWM signal plot 504 of a PWM signal, a demodulated signal plot 506 of a demodulated signal, and a packet good signal plot 508 of a packet good signal.

Figure 6:
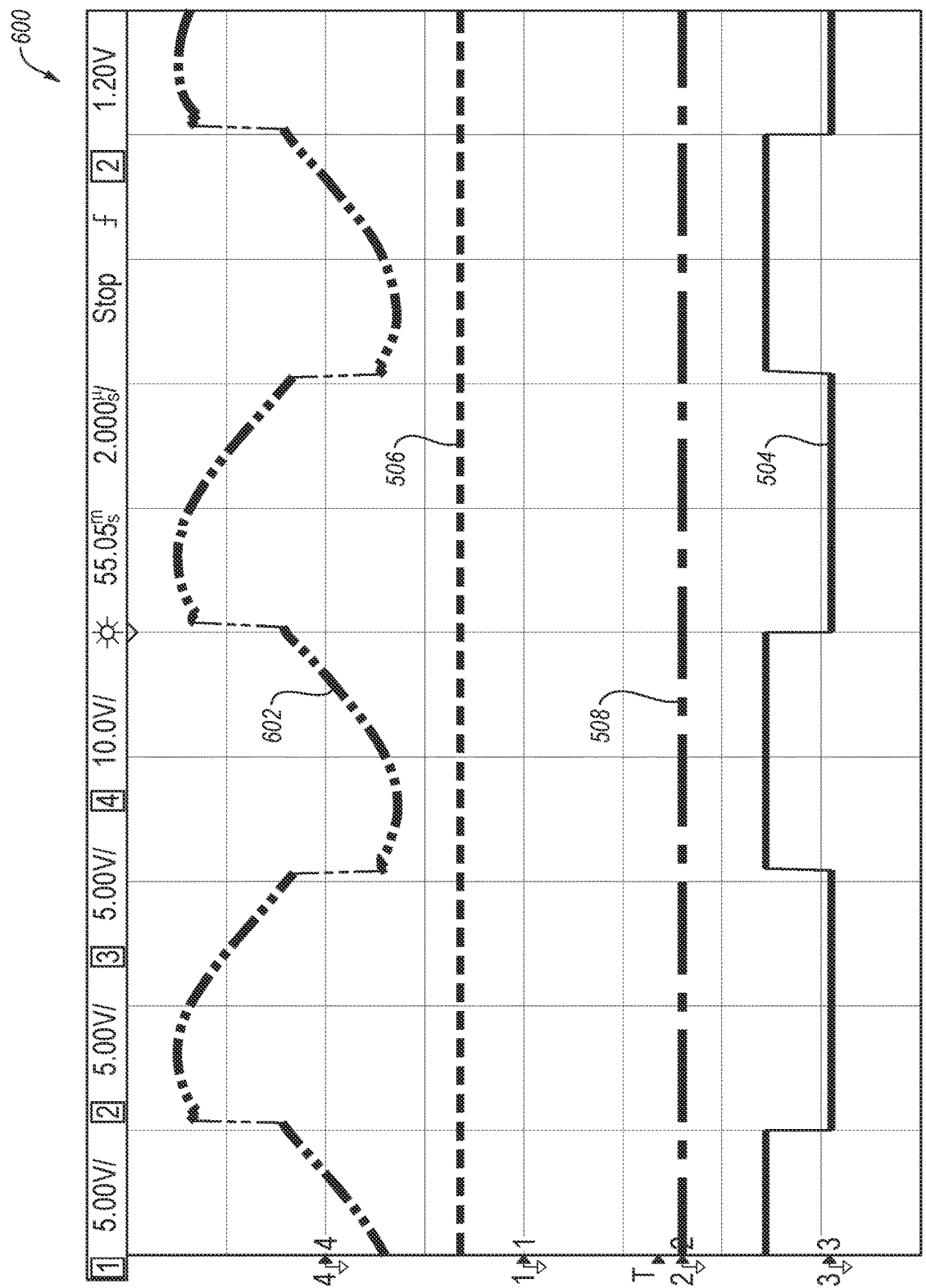
FIG. 6 is a plot of example waveforms of the transmitter with a full load at the output load of the receiver, according to one or more examples.

The coil voltage potential in coil voltage potential plot 502 may be rectified with a diode and stepped down (e.g., to 3.3 V) using a resistor divider (e.g., divider circuit 222 of FIG. 2). Accordingly, a positive portion of the coil voltage potential is applied to an ADC at an input of microcontroller 208 (FIG. 2). At no load in FIG. 5, the coil voltage potential has a peak at half of its on-time (e.g., substantially in its center). As the load increases, with reference to waveforms of FIG. 6, the center shifts to the left of the half point of the on-time, as illustrated in a coil voltage potential plot 600 of an adjusted coil voltage potential 602 in FIG. 6. In one or more examples, the coil voltage potential may be used as a reference in the control loop of FIGS. 3 and 4, and the reference may be updated based on the feedback received from the receiver.

Different methods may be used to determine the coil voltage amplitude for control and demodulation. In one or more examples, sampling of the voltage waveform may be performed using an averaging mode or process of the ADC. Here, multiple samples may be taken per signal period of voltage waveform and made available for processing (e.g., averaging). In order to prevent transients of the signal from influencing the averaging, sampling may be initiated after a delay from the beginning of the generation of the PWM signals. The samples may be spaced apart uniformly along the period of the PWM signal. In one or more examples, the number of samples taken per period is eight (8); however, any suitable number of samples may be taken per period. In one or more examples, the average of samples may be available at the end and processed through use of an interrupt (e.g., according to the flowchart of FIG. 7).

Figure 7:
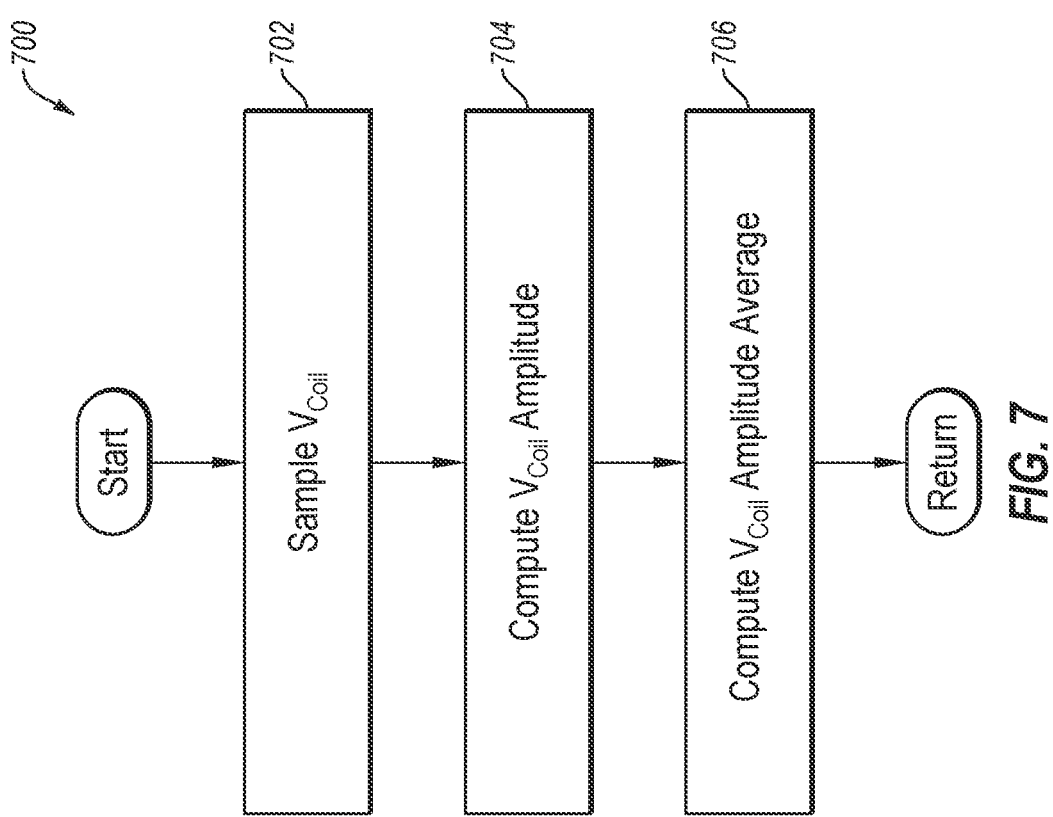
FIG. 7 is a flowchart of a method for obtaining a coil voltage amplitude for control and/or demodulation, according to one or more examples.

FIG. 7 is a flowchart of a method 700 for obtaining a coil voltage amplitude for control and/or demodulation, according to one or more examples. In one or more examples, method 700 may be an interrupt service method which is responsive to an interrupt. Method 700 includes reading an average coil voltage value (or sample of $V_{coil}$) once per sampling period, at an act 702. The ADC value (i.e., the average coil voltage value or sample of $V_{coil}$) is processed to compute an amplitude of the coil voltage potential $V_{coil}$ at an act 704. A four (4) point moving average of the amplitude is taken at an act 706, and is used as a reference for the control loop of FIGS. 3 and 4.

Figure 8:
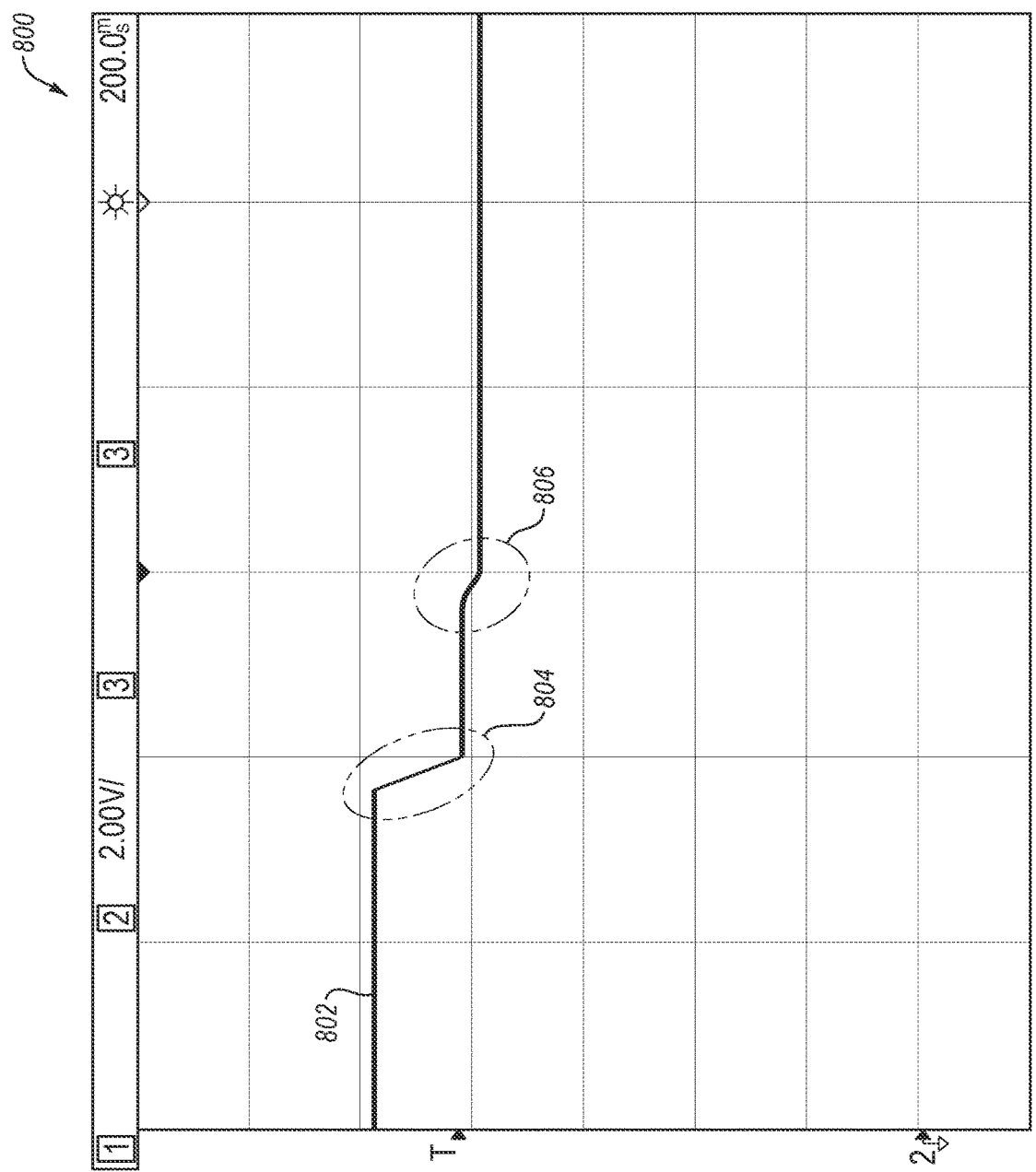
FIG. 8 is a plot of a transmitter voltage output over time of a transmitter, according to one or more examples.

FIG. 8 is a plot 800 of a transmitter voltage output 802 over time of a transmitter, according to one or more examples. In FIG. 8, transmitter voltage output 802 is of constant frequency variable voltage, provided to demonstrate control loop action, which is more clear to demonstrate than with variable frequency. In one or more examples, the transmitter may be transmitter 102 of FIG. 1 or transmitter 202 of FIG. 2, which may operate with receiver 104 of FIG. 1 or receiver 204 of FIG. 2. In one or more examples, the inverter frequency may be the frequency of H-bridge inverter 206 of transmitter 202 of FIG. 2.

The transmitter may adjust transmitter voltage output 802 to control the inverter frequency in response to feedback from the receiver. In the example of FIG. 8, it is shown that transmitter voltage output 802 is adjusted with two (2) voltage adjustments, including a first voltage adjustment 804 and a second voltage adjustment 806. In one or more examples, first and second voltage adjustments 804 and 806 may be made in response to two (2) respective control error packets. A respective one of the control error packets may initiate four iterations (j) to converge to a desired output voltage potential. If the error is large, multiple error packets may be communicated to reach the desired output voltage potential to the receiver.

The demodulation of the signal from the receiver may be performed responsive to any one or more of the following signals: a coil voltage potential, a coil current, and an input current provided by a DC voltage source (e.g., DC voltage source 212 of FIG. 2). The coil voltage potential and the coil current have a relatively high frequency component from which the receiver signal may be demodulated. However, the input current provided by DC voltage source 212 is heavily filtered and resembles a DC waveform. In one or more examples, the input current may also be used for power calculation and foreign object detection.

Note that the failure of communication between the receiver and the transmitter (e.g., failure of the transmitter to correctly receive control error packets (CEPs)) may hinder control loop processing (e.g., FIGS. 2 and 3) for controlling power delivered to the receiver. Several transmitter types and receiver types may interact or interface with each other over a range of x, y, and z coordinates. At some points, the demodulation signal seen by the transmitter does not contain any modulation depth. This may lead to power stalling due to communication timeout by the transmitter and restart of the protocol, as described earlier above. Even after restart, the protocol still leads to the same stalling point as relative transmitter-receiver distance or misalignment may not have changed.

According to one or more examples of the disclosure, an apparatus may comprise a wireless power transmitter. The apparatus and/or wireless power transmitter may include transmitter circuitry. The transmitter circuitry may include a transmit coil to inductively couple with a receive coil of the wireless power receiver. The apparatus and/or wireless power transmitter may further include a controller (e.g., a microcontroller, and/or additional or other processing circuitry, without limitation; e.g., microcontroller 208 of FIG. 2). The controller may control the transmitter circuitry to generate a wireless power signal in the transmit coil. In one or more examples, the transmitter may include an inverter (e.g., H-bridge inverter 206 of FIG. 2) and the controller may generate a PWM signal to the inverter to generate the wireless power signal in the transmit coil. The controller may also perform demodulation on a communication signal, modulated over the wireless power signal, in attempt to decode one or more packets from the wireless power receiver. In one or more examples, the controller may perform demodulation on the communication signal that is proportional to one or more of: a coil voltage potential of the transmit coil, a coil current of the transmit coil, or an input current provided to the transmitter circuitry by a power supply. In one or more examples, the one or more packets may comprise a control error packet for controlling power level to the wireless power receiver. The controller may perturb an operating point of the transmitter circuitry responsive to identifying a failure in decoding the one or more packets. In one or more examples, the operating point to be perturbed may be a frequency of the generated PWM signal. In one or more other examples, the operating point to be perturbed may be a duty-cycle of the generated PWM signal.

In one or more examples, the controller may, responsive to identifying the failure in decoding the one or more packets, again control the transmitter circuitry (i.e., at the perturbed operating point) to generate the wireless power signal, and again perform the demodulation on the communication signal in attempt to decode one or more other packets. In one or more examples, the controller may, responsive to again identifying a failure in decoding the one or more other packets, again perturb the operating point of the transmitter circuitry responsive to identifying a failure in decoding the one or more other packets, and again control the transmitter circuitry (i.e., at the again-perturbed operating point) to generate the wireless power signal. Put another way, the controller may repeat the controlling of the transmitter circuitry to generate the wireless power signal, the performing of demodulation on the communication signal, and the perturbing of the operating point, up to N times (for example) until one or more packets are decoded.

Figure 10:
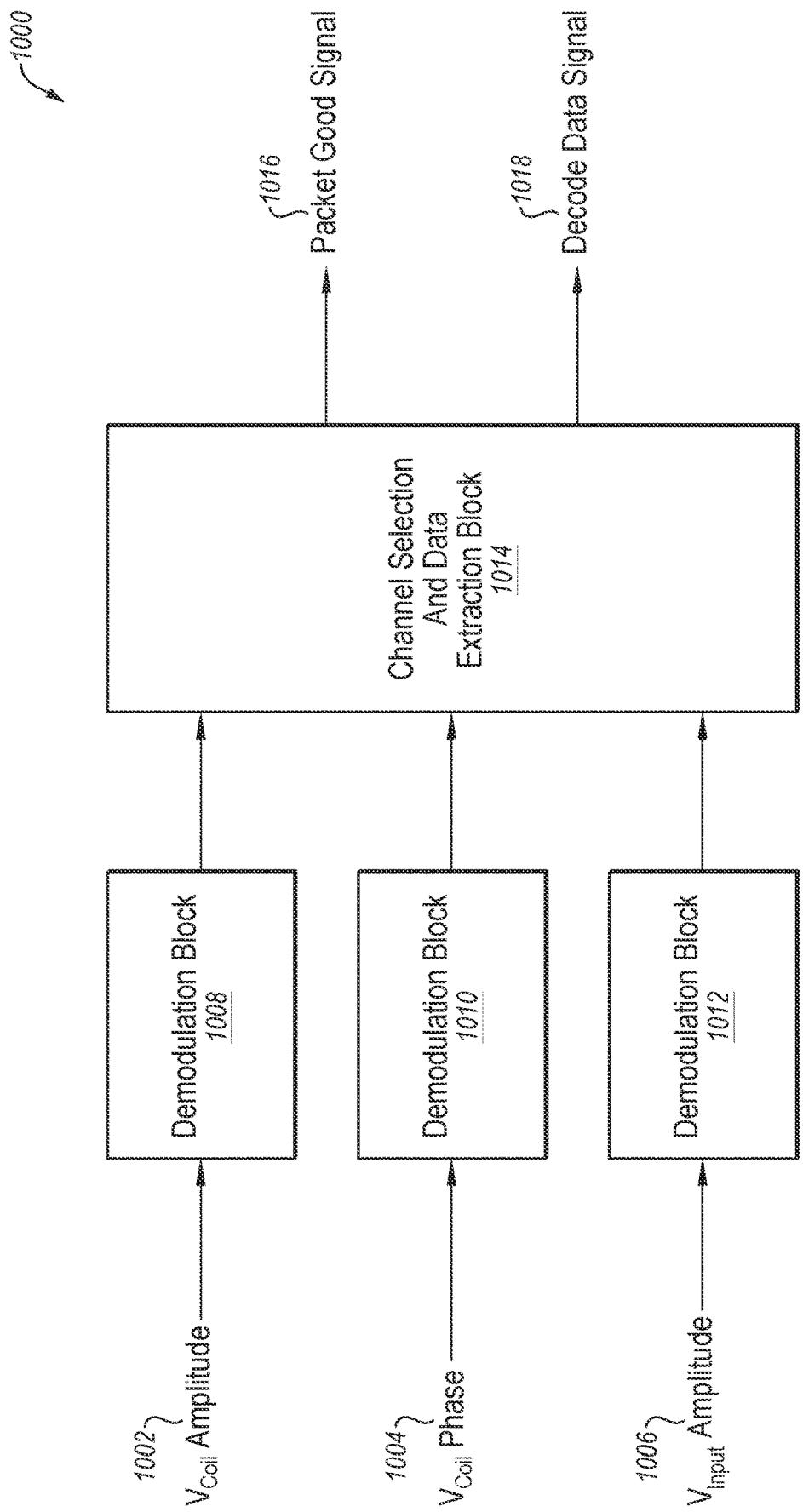
FIG. 10 is a block diagram of a demodulation process of a transmitter, according to one or more examples.

In one or more examples, the controller may include multiple demodulation channels to demodulate the communication signal (e.g., FIG. 10). Here, a channel selection and data extraction process may be used to provide a decoded data signal and a packet good signal responsive to a packet received via one of the multiple demodulation channels.

In one or more examples, the controller may identify the failure in decoding the one or more packets by identifying a failure in decoding multiple packets over a period of time defined by a first timer (e.g., an expiration of which causes the controller to perturb the operating point). As an example, the controller may set a first timer to an initial value and run the first timer for defining a period of time within which to perform the demodulation, where the initial value of the first timer is less than a value of a second timer used for transmitter timeout for shutdown of wireless power transfer. The controller may identify the failure in decoding the one or more packets when no packet is correctly decoded within the period of time.

In one or more examples, the controller may generate an array of change values for perturbation of the operating point. In one or more examples, the array of change values includes randomly-generated values within limits of +/−X % (e.g., FIG. 12). In one or more examples, the array of change values includes values that decrease in magnitude from a start of the array to an end of the array (e.g., FIG. 13).

Figure 9:
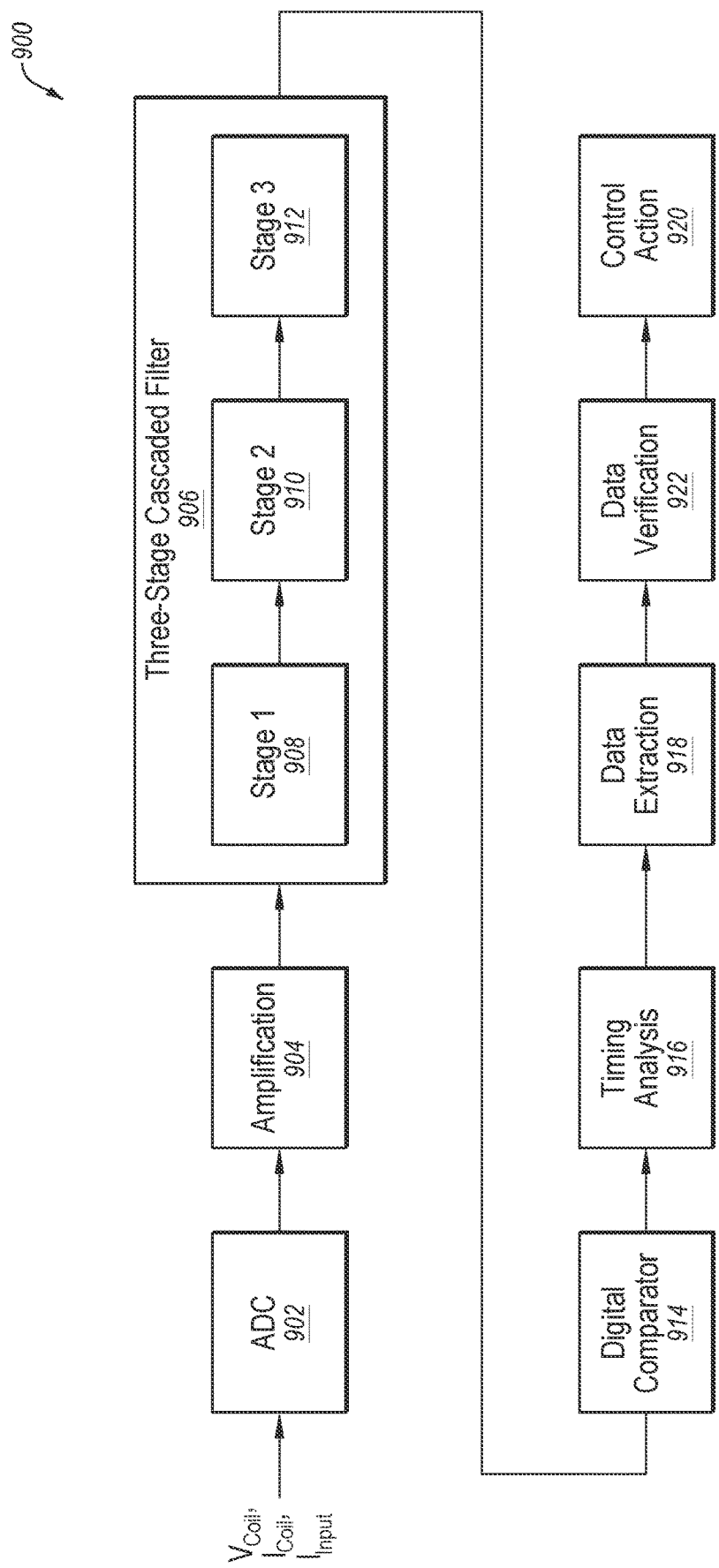
FIG. 9 is a block diagram of a digital demodulator of a transmitter, according to one or more examples.

FIG. 9 is a block diagram of a digital demodulator 900 of a transmitter, according to one or more examples. In one or more examples, digital demodulator 900 may be used in transmitter 102 of FIG. 1 or transmitter 202 of FIG. 2. In one or more examples, digital demodulator 900 may demodulate communications from a receiver, such as receiver 104 of FIG. 1 or receiver 204 of FIG. 2.

In FIG. 9, digital demodulator 900 is to demodulate communications from a receiver responsive to a coil voltage potential $V_{coil}$, a coil current an input current $I_{input}$ provided by the DC voltage source, or a combination thereof. The signal is processed by an ADC 902 (e.g., of microcontroller 208 of FIG. 2) to generate an average value (e.g., an average voltage or current value, without limitation) having an ADC bit resolution (e.g., 12 bits for a unipolar 12-bit value). The average value may be further processed to remove a DC component (e.g., 1.65 V, without limitation). The resulting signal is amplified by an amplification process 904. In one or more examples, amplification process 904 may amplify the signal by eight (8), which here results in a 16-bit signed average signal (e.g., a voltage signal or a current signal, without limitation).

The processed signal is passed through a three-stage cascaded filter 906 (also referred to as a "compensator") to filter out the high and low frequency components. In FIG. 9, three-stage cascaded filter 906 is shown to include a stage-1 process 908, a stage-2 process 910, and a stage-3 process 912. The high-pass section filters out the average component present in the signal due to the half-wave rectification. The low-pass filter has two (2) sections to effectively filter out the 125 kHz component present in the signal. The 125 kHz component appears as ripple in the compensator output if the filtering process is inefficient. In one or more examples, the high-pass filter cutoff is set to 1000 Hz, and the low-pass frequency cutoff is set to 5000 Hz, which provides a bandpass filter effect between 1-5 kHz. As the signal of interest is between 1-2 kHz, the output of the compensator provides a demodulated signal.

A digital comparator 914 compares the compensator output against a threshold (e.g., with hysteresis) to obtain a digital signal. In one or more examples, the digital signal has levels of 0 and 3.3 V. The digital signal is input to an input capture module to verify timing, by a timing analysis process 916, and to extract a bit "0" or "1" from the signal. In one or more examples, the signal is encoded in such a way that absence of transition for 500 microseconds (μs) results in a '0' (or equivalently, a logic low level), while a 250 μs transition equals to a (or equivalently, a logic high level).

In the Qi message structure, several '1's are used to synchronize the detection, followed by a start bit, an eight-bit message, parity (or parity bits), and a stop bit. A data extraction process 918 extracts the message, starting with the start bit, and a data verification process 922 computes a checksum and compares it with the parity to determine if the message is received correctly. Note there are several messages passed between the transmitter and receiver, including the control error value. The receiver measures the voltage, compares it with a reference, and sends the control error to the transmitter as an eight-bit signed integer. A control loop of the transmitter (e.g., transmitter control process 400 of FIG. 4) applies the control error (CE) to the coil current value and takes corrective action at a control action process 920.

In one or more examples, both the average and peak values are used to measure the coil voltage potential and are passed through multiple parallel paths (e.g., as shown in FIG. 10). The path that decodes the packet correctly is used to process the data sent by the receiver. The packet good signal has a change in state when the packet is processed correctly.

FIG. 10 is a block diagram of a demodulation process 1000 of a transmitter, according to one or more examples. In one or more examples, demodulation process 1000 includes multiple demodulation processes operating in parallel. In one or more examples, demodulation process 1000 includes a demodulation block 1008 to receive a $V_{coil}$ amplitude 1002, a demodulation block 1010 to receive a $V_{coil}$ phase 1004, and a demodulation block 1012 to receive an $I_{input}$ amplitude 1006. Demodulation block 1008, demodulation block 1010, and demodulation block 1012 may include respective digital demodulators (e.g., digital demodulator 900 of FIG. 9). Accordingly, respective ones of demodulation block 1008, demodulation block 1010, and demodulation block 1012 may provide corresponding packets, which in a non-limiting example include the Qi message structure (e.g., several '1's to synchronize the detection, followed by a start bit, an eight-bit message, parity, and stop bit).

More particularly, demodulation process 1000 includes a channel selection and data extraction block 1014 to receive packets provided by respective ones of demodulation block 1008, demodulation block 1010, and demodulation block 1012. Channel selection and data extraction block 1014 selects a decoded data signal 1018 from among the packets provided by demodulation block 1008, demodulation block 1010, and demodulation block 1012. Responsive to the parity bit or bits provided by the packets, channel selection and data extraction block 1014 determines whether decoded data signal 1018 corresponds to a correctly demodulated signal. Responsive to a determination that decoded data signal 1018 corresponds to a correctly demodulated signal, channel selection and data extraction block 1014 asserts a packet good signal 1016.

Figure 11:
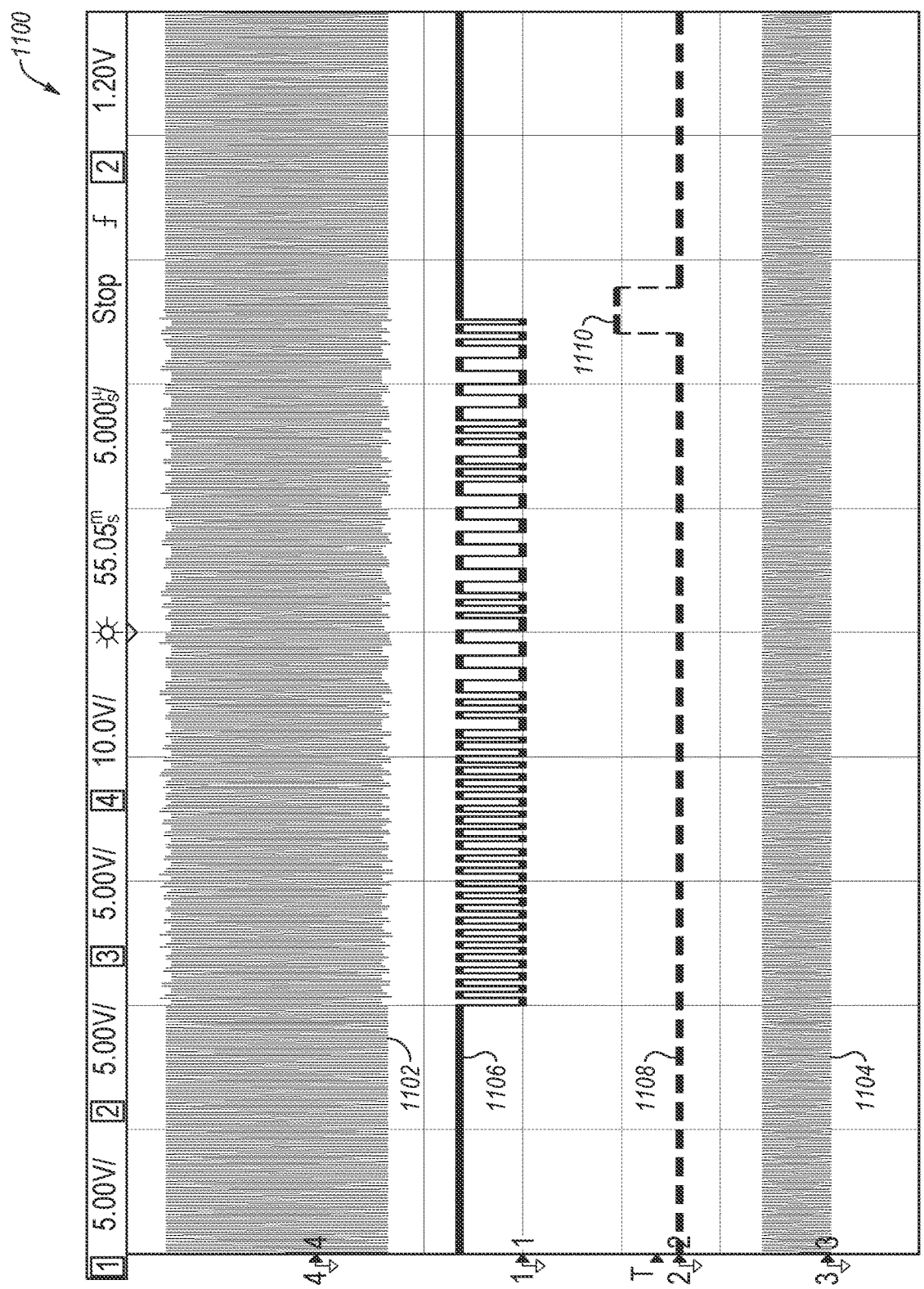
FIG. 11 is a graph of example waveforms of a wireless power system, processed under a no load condition.

FIG. 11 is a graph of waveforms 1100 of wireless power system 200 of FIG. 2, processed under a no load condition. Waveforms 1100 include a coil voltage potential signal 1102, a PWM signal 1104, a demodulated signal 1106, and a packet good signal 1108 (e.g., packet good signal 1016 of FIG. 10, without limitation). Coil voltage potential signal 1102 is demodulated to extract receiver data in the form of a data packet. A parity check is performed in relation to the data packet, and a valid packet is generated/indicated if the parity is valid. A valid packet is signaled by an assertion 1110 of packet good signal 1108. The message may be processed for further action based on the message type.

An operating point perturbation may be performed in one or more of a variety of different ways. In a non-limiting example, a random number may be selected or generated within a set of constraints. In another non-limiting example, a predetermined number may be selected from a generated pattern of values (e.g., triangular pattern) within a set of constraints. In one or more examples, a frequency value or a duty-cycle value may be perturbed such that the operating point does not extend beyond +/−X %. In one or more examples, a number of N different points may be generated and stored in an N-element array.

Figure 12:
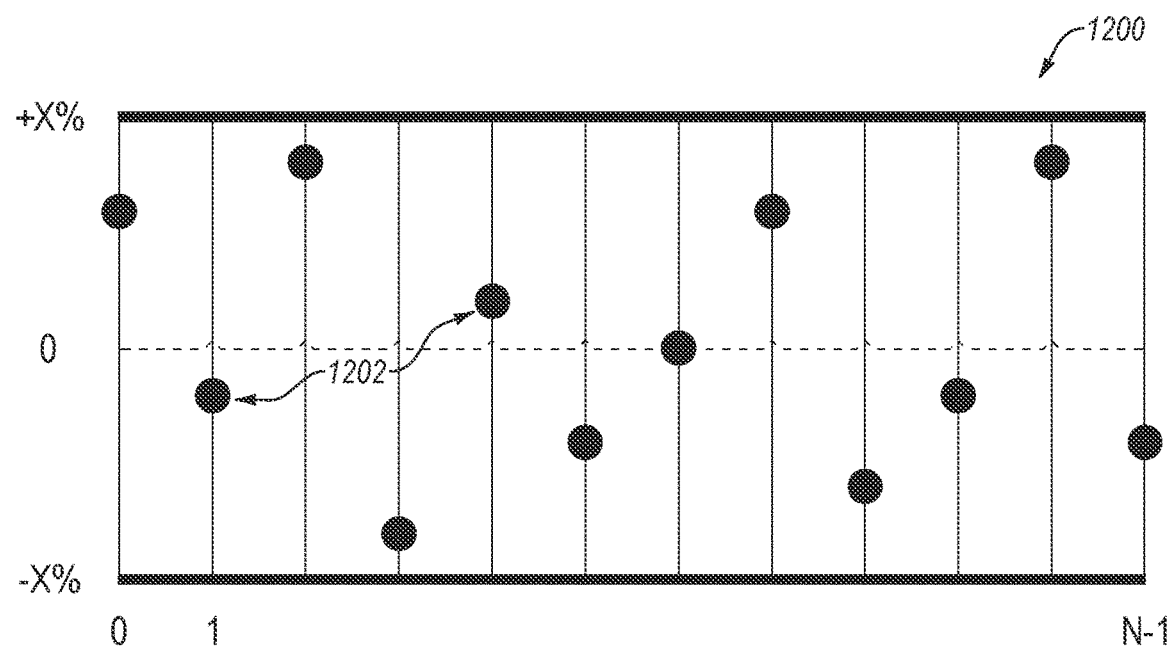
FIG. 12 is a plot diagram of a random distribution of values that may be used to perturb frequency or duty-cycle values, according to one or more examples.

FIG. 12 is a plot diagram 1200 of a random distribution of values 1202 that may be used to perturb frequency or duty-cycle values in an operating point perturbation method, according to one or more examples. As shown, random distribution of values 1202 are generated to be within +/−X %. Random distribution of values 1202 illustrate an example of an array of change values (or perturbation values) which may be generated, stored in memory, and used to perturb the frequency or duty-cycle values.

Figure 13:
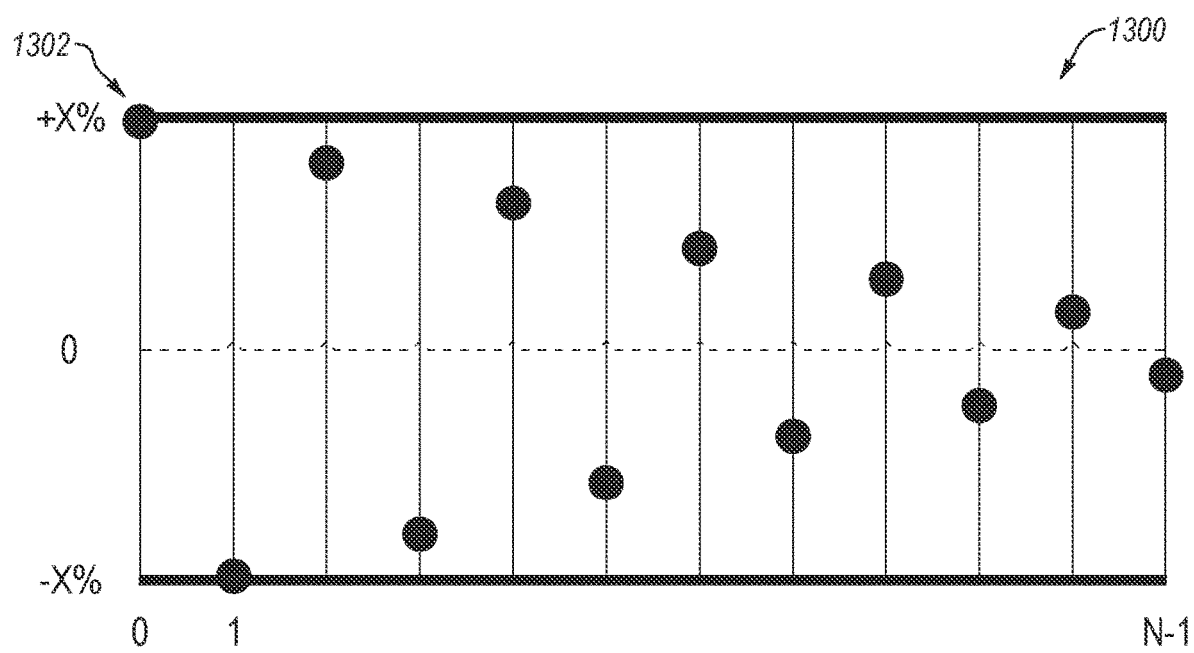
FIG. 13 is a plot diagram of a triangular pattern of values that may be used to perturb frequency or duty-cycle values, according to one or more examples.

FIG. 13 is a plot diagram 1300 of a triangular pattern of values 1302 that may be used to perturb frequency or duty-cycle values in an operating point perturbation method, according to one or more examples. As shown, triangular pattern of values 1302 are generated to be within +/−X %. Triangular pattern of values 1302 illustrate an example of an array of change values (or perturbation values) which may be generated, stored in memory, and used to perturb the frequency or duty-cycle values.

In the triangular pattern of FIG. 13, the values start at a maximum (relatively higher) value and decay as each step progresses. In general, starting with a higher perturbation should sufficiently adjust the operating point so that the packet is successfully demodulated, at least more quickly or efficiently. Alternatively, the triangular pattern may start with a minimum (relatively lower) value and increase progressively until either the limits are reached or the packet is demodulated. In one or more examples, the limit X may vary, and may be selected and set based at least in part on the type of transmitter. For example, the limit X may be within the range of 5%, without limitation.

Accordingly, in one or more examples, a number of N different values (e.g., a random distribution of values, or a triangular pattern of values) may be generated and stored in an N-element array. For a frequency mode of operation of the transmitter, the values may be stored in an array "F(Count)," where Count is an index from 1 to N into the array. For a duty-cycle mode of operation of the transmitter, the values may be stored in an array "D(Count)," where again Count is an index from 1 to N into the array.

Thus, according to one or more examples of the disclosure, an apparatus may comprise a wireless power transmitter. The apparatus and/or wireless power transmitter may include transmitter circuitry. The transmitter circuitry may include a transmit coil to inductively couple with a receive coil of the wireless power receiver. The apparatus and/or wireless power transmitter may further include a controller (e.g., a microcontroller, and/or additional or other processing circuitry, without limitation; e.g., microcontroller 208 of FIG. 2). The controller may control the transmitter circuitry to generate a wireless power signal in the transmit coil. The controller may also perform demodulation on a communication signal, modulated over the wireless power signal, in attempt to decode one or more packets from the wireless power receiver. In one or more examples, the one or more packets may comprise a control error packet for controlling power level to the wireless power receiver. The controller may, at least partially responsive to identifying a failure in decoding the one or more packets over a period of time, identify a current value of an operating point of the transmitter circuitry; perturb the operating point by adding a selected one of multiple change values, from an array of change values, to the current value of the operating point; and repeat the controlling of the transmitter circuitry to generate the wireless power signal, at the perturbed operating point, the performing of the demodulation on the communication signal, and the perturbing of the operating point until one or more packets are decoded (e.g., up to N times for an array of N change values until one or more packets are decoded).

In one or more examples, the controller may generate the array of change values for perturbing of the operating point (e.g., upon the first time of identifying failure in the decoding of the one or more packets over the period of time). In one or more examples, the array of change values includes randomly-generated values within limits of +/−X % (e.g., FIG. 12). In one or more other examples, the array of change values includes values that decrease in magnitude from a start of the array to an end of the array (e.g., triangular pattern), within limits of +/−X % (e.g., FIG. 13). In one or more further examples, the controller may identify a current operating mode to be one of a frequency operating mode or a duty-cycle operating mode; and responsive to identifying the current operating mode to be the frequency operating mode, use a first array of change values for changing frequency (e.g., an N-element array of F(Count)); and responsive to identifying the current operating mode to be the duty-cycle operating mode, use a second array of change values for changing duty-cycle (e.g., an N-element array of D(Count)).

Figure 14A:
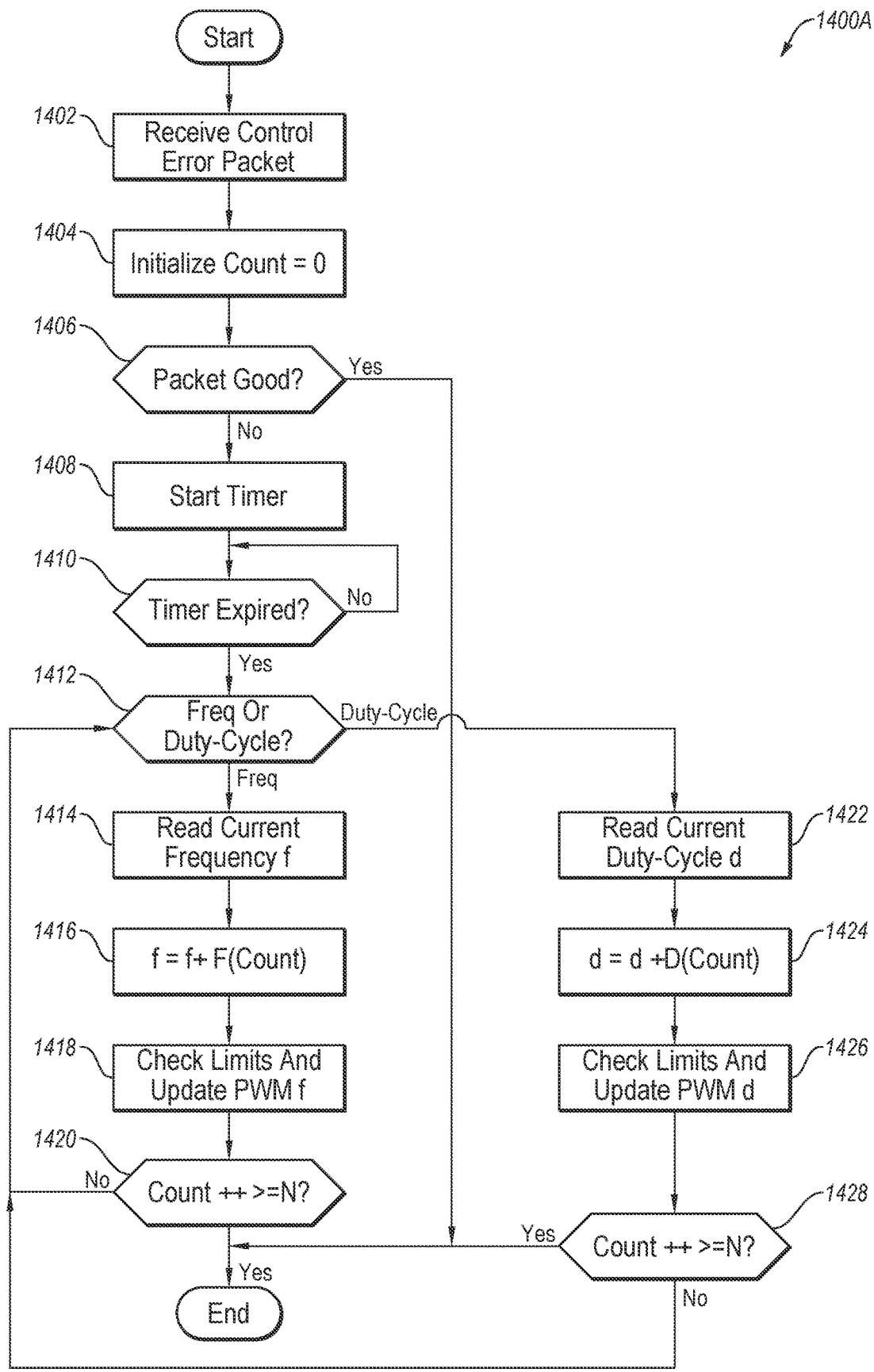
FIG. 14A is a flowchart for describing a method of preventing stalling of wireless power transfer in a wireless power system, according to one or more examples.

FIG. 14A is a flowchart for describing a method 1400A of preventing stalling of wireless power transfer in a wireless power system, according to one or more examples. Method 1400A may be performed by a transmitter (e.g., transmitter 102 of FIG. 1 or transmitter 202 of FIG. 2, without limitation) to transfer power to a receiver (e.g., receiver 104 of FIG. 1 or receiver 204 of FIG. 2, without limitation). By way of non-limiting example, method 1400A may be performed by microcontroller 208 of transmitter 202 of FIG. 2.

In method 1400A, the transmitter interfaces with the receiver and monitors communications for receipt of a control error packet. In one or more examples, the control error packet may be sent at (e.g., regular or periodic) intervals determined by the receiver. By way of non-limiting example, a control error packet (CEP) may be sent by the receiver substantially every 250 milliseconds (ms). The transmitter may (e.g., eventually) receive a control error packet, at an act 1402. The transmitter may initialize a count in the array of perturbation values (e.g., Count=1, without limitation), at an act 1404. The transmitter may determine whether the CE packet is good (e.g., the packet is successfully demodulated and decoded), at an act 1406. In one or more examples, the determination may be based at least in part on identifying a packet good signal from one of multiple demodulation channels (e.g., as described in relation to FIG. 10). Responsive to a determination that the packet is good, method 1400A may end and the transmitter may transition from operating in a perturbation mode to a normal power transfer mode.

Responsive to a determination that the packet is not good (e.g., an unsuccessful demodulation and decoding), method 1400A includes starting a timer to set a time period, at an act 1408, to wait until one or more packets are decoded. In one or more examples, the timer may be initialized with a value greater than the control error packet timing (e.g., of 250 ms) but less than the transmitter timeout (e.g., of 1800 ms). In a specific, non-limiting example, the timer initialized with a value of 1000 ms allows the transmitter to decode (e.g., using digital demodulator 900 of FIG. 9) up to four (4) packets within the time period. If the packet is correctly decoded within the time period, the transmitter will transition to the normal power transfer mode. If the packet is not decoded within the time period, the timer will expire. Responsive to timer expiration at an act 1410, operation proceeds to a perturbation control loop which begins at an act 1412.

In the perturbation control loop, the transmitter determines a current mode of operation of the transmitter, at the act 1412. In one or more examples, the current mode of operation may be one of a frequency mode of operation or a duty-cycle mode of operation. In case of MP-A22, the transmitter operates in a frequency mode of operation in the frequency band of 100 kHz to 148 kHz. Once 148 kHz is reached, the mode of operation changes to the duty-cycle mode of operation. If the duty-cycle hits upper limits of 50%, the mode of operation changes back to the frequency mode of operation.

In response to determining that the current mode of operation is the frequency mode of operation, the transmitter obtains a current operating frequency f (e.g., in kHz), at an act 1414. The transmitter changes the current operating frequency by adding a value selected from the array of perturbation values to the current operating frequency, to obtain a new value for the frequency f, at an act 1416. In one or more examples, the value is selected from the array F(Count) having random distribution of values 1202 (FIG. 12) or triangular pattern of values 1302 (FIG. 13). The transmitter checks that the new value has not exceeded limits and updates the PWM frequency f, at an act 1418. In one or more examples, if the frequency value is out-of-range (e.g., from limits of +/−X %), the value may be "clamped" or set to the respective limit (e.g., the + or −X % limit). The transmitter increments the value of Count and determines whether the incremented value for Count is greater than or equal to N (i.e., the number of elements in F(Count)), at an act 1420. Responsive to a determination that the incremented value of Count is not greater than or equal to N, operation returns to the beginning of the perturbation control loop (at the act 1412). Responsive to a determination that the incremented value of Count is greater than N, the method 1400A ends.

In response to determining that the current mode of operation is the duty-cycle mode of operation, the transmitter obtains a current duty-cycle d, at an act 1422. The transmitter changes the current duty-cycle d by adding a value selected from the array of perturbation values to the current duty-cycle, to obtain a new value for the duty-cycle d, at an act 1424. In one or more examples, the value is selected from the array D(Count) having random distribution of values 1202 (FIG. 12) or triangular pattern of values 1302 (FIG. 13). The transmitter checks that the new value has not exceeded limits and updates the PWM duty-cycle d, at an act 1426. In one or more examples, if the duty-cycle value is out-of-range (e.g., from the limits of +/−X %), the value may be "clamped" or set to the respective limit (e.g., the + or −X % limit). The transmitter increments the value of Count and determines whether the incremented value for Count is greater than or equal to N (i.e., the number of elements in D(Count)), at an act 1428. Responsive to a determination that the incremented value of Count is not greater than or equal to N, operation returns to the beginning of the perturbation control loop (at the act 1412). Responsive to a determination that the incremented value of Count is greater than N, the method 1400A ends.

As previously discussed in relation to act 1406 of FIG. 14A, if the packet good signal is received or asserted in relation to one of the multiple demodulation channels (e.g., FIG. 10), the transmitter exits the perturbation mode and proceeds to operate in a normal power transfer mode. If the packet good signal is not received or asserted, the perturbation point is adjusted or moved based on the incremented counter value. This continues until all the N elements of the array (e.g., all of the perturbation values) have been utilized. Note that, if the values are correctly generated and set, a packet good signal should be indicated before the counter reaches the value of N. Accordingly, demodulating/decoding issues may be efficiently detected (e.g., substantially every time) before the issues result in a repeating power transfer stalling.

Figure 14B:
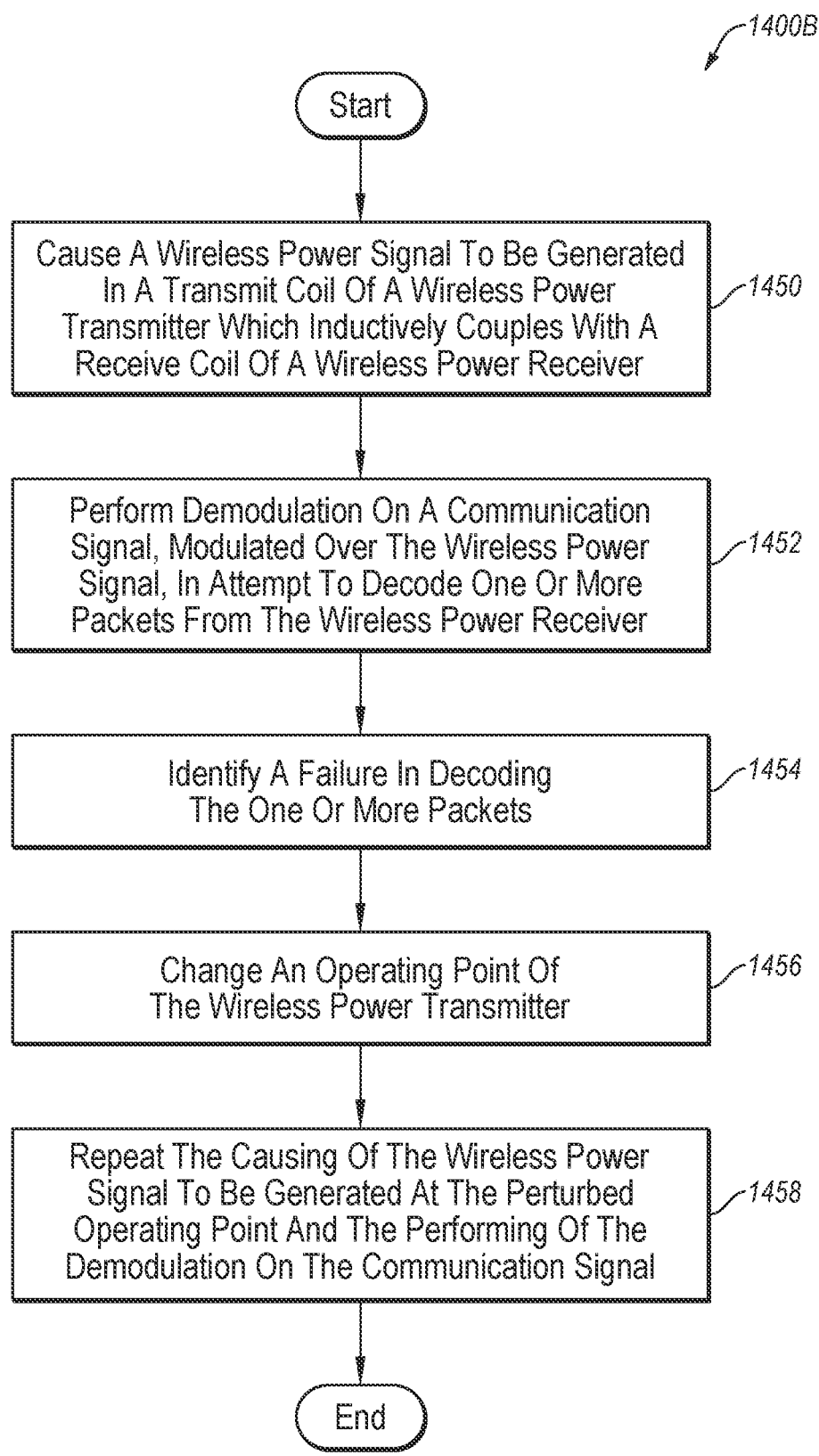
FIG. 14B is a flowchart for describing a method of preventing stalling of wireless power transfer in a wireless power system, according to one or more examples.

FIG. 14B is a flowchart for describing a method 1400B of preventing stalling of wireless power transfer in a wireless power system, according to one or more examples. The method 1400B may be performed by a transmitter (e.g., transmitter 102 of FIG. 1 or transmitter 202 of FIG. 2, without limitation) to transfer power to a receiver (e.g., receiver 104 of FIG. 1 or receiver 204 of FIG. 2, without limitation). By way of non-limiting example, the method 1400B may be performed by microcontroller 208 of transmitter 202 of FIG. 2.

Method 1400B of FIG. 14B includes causing a wireless power signal to be generated in a transmit coil of a wireless power transmitter which inductively couples with a receive coil of a wireless power receiver, at an act 1450. Method 1400B further includes performing demodulation on a communication signal, modulated over the wireless power signal, in attempt to decode one or more packets from the wireless power receiver, at an act 1452. Method 1400B further includes, at least partially responsive to identifying a failure in decoding the one or more packets, at an act 1454, changing an operating point of the wireless power transmitter, at an act 1456, and repeating the causing of the wireless power signal to be generated at the perturbed operating point and the performing of the demodulation on the communication signal, at an act 1458. In one or more examples, the one or more packets to be decoded comprises a control error packet (CEP) for controlling power level to the wireless power receiver.

In one or more examples, causing the wireless power signal to be generated in act 1450 comprises generating a PWM signal to an inverter of the wireless power transmitter, and the operating point for perturbation comprises a frequency of the generated PWM signal. In other one or more examples, causing the wireless power signal to be generated in act 1450 comprises generating a PWM signal to an inverter of the wireless power transmitter, and the operating point for perturbation comprises a duty-cycle of the generated PWM signal.

In one or more examples, identifying the failure in decoding the one or more packets in act 1454 comprises identifying a failure in decoding multiple packets over a period of time defined by a timer, an expiration of which causes the changing of the operating point. The failure in decoding a respective packet of the multiple packets comprises detecting an error in the respective packet based on one or more parity bits of the respective packet. In one example, method 1400B may include setting a first timer to an initial value and running the first timer for defining a period of time within which to perform the demodulation, where the initial value of the first timer is less than a value of a second timer used for transmitter timeout for shutdown of wireless power transfer. Here, identifying the failure in decoding the one or more packets is when no packet is correctly decoded within the period of time.

Figure 15:
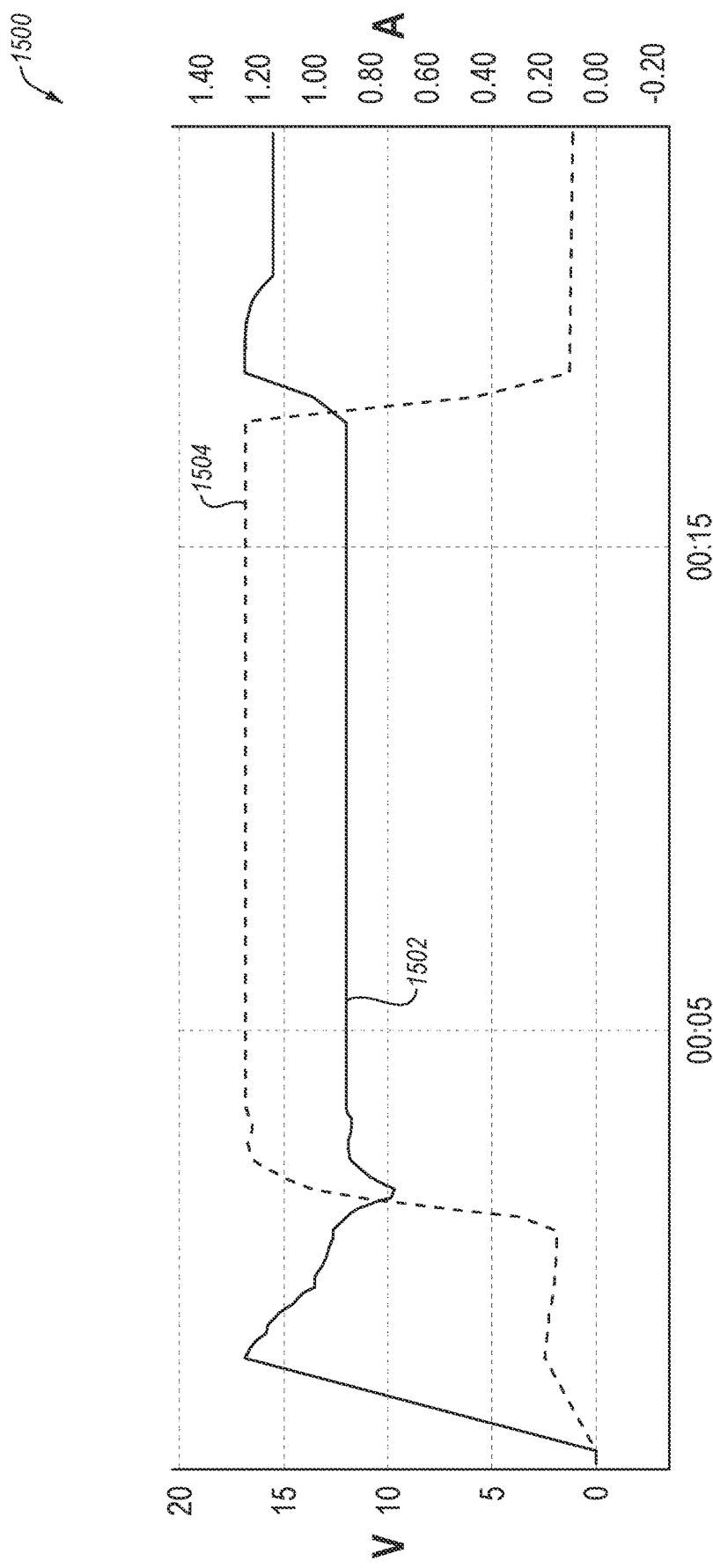
FIG. 15 is a graph of example receiver waveforms without the transmitter adapted according to one or more examples of the disclosure.

FIG. 15 is a graph of receiver waveforms 1500 without the transmitter adapted according to one or more examples of the disclosure (e.g., without use of method 1400A of FIG. 14A or method 1400B of FIG. 14B). Receiver waveforms 1500 include a rectified voltage potential 1502 and a rectified current 1504. Here, the transmitter "times out" due to a control error value not being decoded during calibration phase load switching. Accordingly, wireless power transfer between the transmitter and the receiver will repeatedly stall without use of a method of the disclosure.

Figure 16:
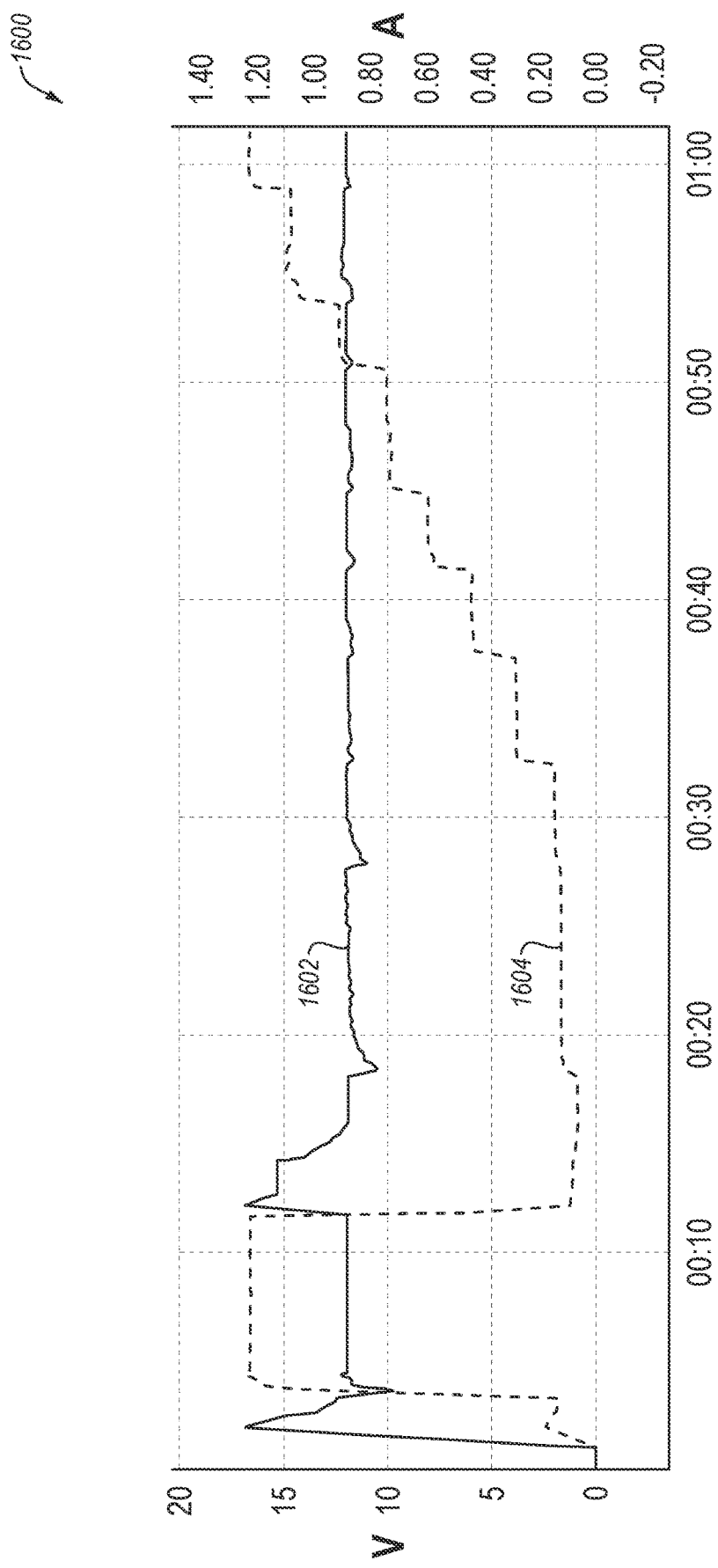
FIG. 16 is a graph of example receiver waveforms with the transmitter adapted according to one or more examples of the disclosure.

FIG. 16 is a graph of receiver waveforms 1600 with the transmitter adapted according to one or more examples of the disclosure (e.g., with use of method 1400A of FIG. 14A or method 1400B of FIG. 14B) (e.g., under identical conditions as those in FIG. 15). Receiver waveforms 1600 include a rectified voltage potential 1602 and a rectified current 1604. The transmitter is shown to continue its transfer of power, in steps, to the receiver across its full power range as a result of use of a method of the disclosure.

Figure 17:
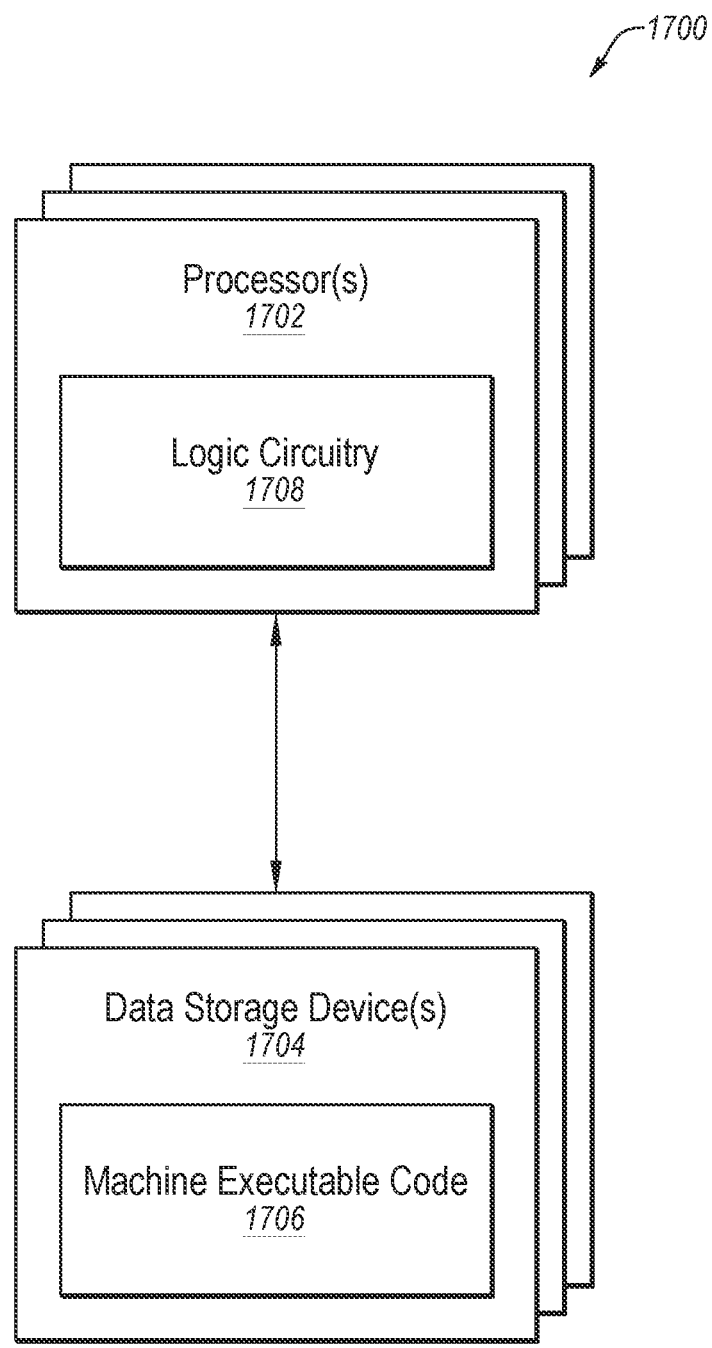
FIG. 17 is a block diagram of circuitry that, in some examples, may be used to implement various functions, operations, acts, processes, and/or methods disclosed herein.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 17 illustrates non-limiting examples of implementations of functional elements disclosed herein. In some examples, some or all portions of the functional elements disclosed herein may be performed by hardware specially programmed for carrying out the functional elements.

FIG. 17 is a block diagram of circuitry 1700 that, in some examples, may be used to implement various functions, operations, acts, processes, and/or methods disclosed herein. The circuitry 1700 includes one or more processors 1702 (sometimes referred to herein as "processors 1702") operably coupled to one or more data storage devices (sometimes referred to herein as "storage 1704"). The storage 1704 includes machine-executable code 1706 stored thereon and the processors 1702 include logic circuitry 1708. The machine-executable code 1706 includes information describing functional elements that may be implemented by (e.g., performed by) the logic circuitry 1708. The logic circuitry 1708 is adapted to implement (e.g., perform) the functional elements described by the machine-executable code 1706. The circuitry 1700, when executing the functional elements described by the machine-executable code 1706, should be considered as special purpose hardware programmed for carrying out functional elements disclosed herein. In some examples the processors 1702 may be programmed to perform the functional elements described by the machine-executable code 1706 sequentially, concurrently (e.g., on one or more different hardware platforms), or in one or more parallel process streams.

When implemented by logic circuitry 1708 of the processors 1702, the machine-executable code 1706 adapts the processors 1702 to perform operations of examples disclosed herein. For example, the machine-executable code 1706 may adapt the processors 1702 to perform at least a portion or a totality of method 700 of FIG. 7, method 1400A of FIG. 14A, and/or method 1400B of FIG. 14B. As another example, the machine-executable code 1706 may adapt the processors 1702 to perform at least a portion or a totality of the operations discussed for one or more of transmitter 102 of FIG. 1, transmitter 202 of FIG. 2, microcontroller 208 of FIG. 2, digital demodulator 900 of FIG. 9, and/or demodulation process 1000 of FIG. 10. As a specific, non-limiting example, the machine-executable code 1706 may adapt the processors 1702 to demodulate a signal received from a receiver, based on a coil voltage potential of a transmit coil, a coil current of the transmit coil, or an input current provided by a power supply; change power delivered to the receiver responsive to the demodulated signal; check for demodulation failure for a certain duration before the communication timeout period of time; generate an array of changes to be applied to an operating point based, at least in part, on the operating mode if the minimum time has elapsed after demodulation failure; determine a present operating mode and actual operating point; perturb the operating point by adding a predetermined component stored in the array of changes; and demodulating the control error and bring the operating point back to normal.

The processors 1702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is programmed to execute functional elements corresponding to the machine-executable code 1706 (e.g., software code, firmware code, hardware descriptions) related to examples of the present disclosure. It is noted that a general-purpose processor (may also be referred to herein as a host processor or simply a host) may be a microprocessor, but in the alternative, the processors 1702 may include any conventional processor, controller, microcontroller, or state machine. The processors 1702 may also be implemented as a combination of computing devices, such as a combination of a DSP and a microprocessor, a plurality of microprocessors, one or more microprocessors in conjunction with a DSP core, or any other such configuration.

In some examples the storage 1704 includes volatile data storage (e.g., random-access memory (RAM)), non-volatile data storage (e.g., Flash memory, a hard disc drive, a solid state drive, erasable programmable read-only memory (EPROM), etc.). In some examples the processors 1702 and the storage 1704 may be implemented into a single device (e.g., a semiconductor device product, a system on chip (SOC), etc.). In some examples the processors 1702 and the storage 1704 may be implemented into separate devices.

In some examples the machine-executable code 1706 may include computer-readable instructions (e.g., software code, firmware code). By way of non-limiting example, the computer-readable instructions may be stored by the storage 1704, accessed directly by the processors 1702, and executed by the processors 1702 using at least the logic circuitry 1708. Also by way of non-limiting example, the computer-readable instructions may be stored on the storage 1704, transferred to a memory device (not shown) for execution, and executed by the processors 1702 using at least the logic circuitry 1708. Accordingly, in some examples the logic circuitry 1708 includes electrically configurable logic circuitry 1708.

In some examples the machine-executable code 1706 may describe hardware (e.g., circuitry) to be implemented in the logic circuitry 1708 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 1706 may include an HDL, an RTL, a GL description, a mask level description, other hardware description, or any combination thereof.

In examples where the machine-executable code 1706 includes a hardware description (at any level of abstraction), a system (not shown, but including the storage 1704) may be programmed to implement the hardware description described by the machine-executable code 1706. By way of non-limiting example, the processors 1702 may include a programmable logic device (e.g., an FPGA or a PLC) and the logic circuitry 1708 may be electrically controlled to implement circuitry corresponding to the hardware description into the logic circuitry 1708. Also by way of non-limiting example, the logic circuitry 1708 may include hard-wired logic manufactured by a manufacturing system (not shown, but including the storage 1704) according to the hardware description of the machine-executable code 1706.

Regardless of whether the machine-executable code 1706 includes computer-readable instructions or a hardware description, the logic circuitry 1708 is adapted to perform the functional elements described by the machine-executable code 1706 when implementing the functional elements of the machine-executable code 1706. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations to perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure include:

Example 1: An apparatus, comprising: transmitter circuitry, the transmitter circuitry including a transmit coil to inductively couple with a receive coil of a wireless power receiver; a controller to: control the transmitter circuitry to generate a wireless power signal in the transmit coil; perform demodulation on a communication signal, modulated over the wireless power signal, in attempt to decode one or more packets from the wireless power receiver; and perturb an operating point of the transmitter circuitry responsive to identifying a failure in decoding the one or more packets.

Example 2: The apparatus according to Example 1, wherein the controller is to perform demodulation on the communication signal that is proportional to one or more of: a coil voltage potential of the transmit coil, a coil current of the transmit coil, or an input current provided to the transmitter circuitry by a power supply.

Example 3: The apparatus according to any of Examples 1 and 2, wherein the one or more packets comprises a control error packet (CEP) for controlling power level to the wireless power receiver.

Example 4: The apparatus according to any of Examples 1 through 3, wherein: the transmitter circuitry comprises an inverter, the controller is to generate a pulse width modulation (PWM) signal to the inverter to generate the wireless power signal in the transmit coil, and the operating point comprises a frequency of the generated PWM signal.

Example 5: The apparatus according to any of Examples 1 through 4, wherein: the transmitter circuitry comprises an inverter, the controller is to generate a pulse width modulation (PWM) signal to the inverter to generate the wireless power signal in the transmit coil, and the operating point comprises a duty-cycle of the generated PWM signal.

Example 6: The apparatus according to any of Examples 1 through 5, wherein: the controller is to, responsive to identifying the failure in decoding the one or more packets: again control the transmitter circuitry, at the perturbed operating point, to generate the wireless power signal, and again perform the demodulation on the communication signal in attempt to decode one or more other packets.

Example 7: The apparatus according to any of Examples 1 through 6, wherein the controller is to, responsive to again identifying a failure in decoding the one or more other packets: again perturb the operating point of the transmitter circuitry responsive to identifying a failure in decoding the one or more other packets, and again control the transmitter circuitry, at the again-perturbed operating point, to generate the wireless power signal.

Example 8: The apparatus according to any of Examples 1 through 7, wherein the controller is to: repeat the controlling of the transmitter circuitry to generate the wireless power signal, the performing of demodulation on the communication signal, and the perturbing of the operating point, up to N times until one or more packets are decoded.

Example 9: The apparatus according to any of Examples 1 through 8, wherein the controller includes: multiple demodulation channels to demodulate the communication signal; and a channel selection and data extraction process, the channel selection and data extraction process to provide a decoded data signal and a packet good signal responsive to a packet received via one of the multiple demodulation channels.

Example 10: The apparatus according to any of Examples 1 through 9, wherein the controller is to identify the failure in decoding the one or more packets by identifying a failure in decoding multiple packets over a period of time defined by a first timer, an expiration of which causes the controller to perturb the operating point.

Example 11: The apparatus according to any of Examples 1 through 10, wherein the controller is to: set a first timer to an initial value and run the first timer for defining a period of time within which to perform the demodulation, the initial value of the first timer being less than a value of a second timer used for transmitter timeout for shutdown of wireless power transfer, and identify the failure in decoding the one or more packets when no packet is correctly decoded within the period of time.

Example 12: The apparatus according to any of Examples 1 through 11, wherein the controller is to generate an array of change values for perturbation of the operating point.

Example 13: The apparatus according to any of Examples 1 through 12, wherein the array of change values includes randomly-generated values within limits of +/−X %, or values that decrease in magnitude from a start of the array to an end of the array.

Example 14: A method comprising: causing a wireless power signal to be generated in a transmit coil of a wireless power transmitter which inductively couples with a receive coil of a wireless power receiver; performing demodulation on a communication signal, modulated over the wireless power signal, in attempt to decode one or more packets from the wireless power receiver; and at least partially responsive to identifying a failure in decoding the one or more packets: changing an operating point of the wireless power transmitter; and repeating the causing of the wireless power signal to be generated, at the changed operating point, and the performing of the demodulation on the communication signal.

Example 15: The method according to Example 14, wherein: causing the wireless power signal to be generated comprises generating a pulse width modulation (PWM) signal to an inverter of the wireless power transmitter, and the operating point comprises a frequency of the generated PWM signal.

Example 16: The method according to any of Examples 14 and 15, wherein: causing the wireless power signal to be generated comprises generating a pulse width modulation (PWM) signal to an inverter of the wireless power transmitter, and the operating point comprises a duty-cycle of the generated PWM signal.

Example 17: The method according to any of Examples 14 through 16, wherein the one or more packets comprises a control error packet (CEP) for controlling power level to the wireless power receiver.

Example 18: The method according to any of Examples 14 through 17, wherein identifying the failure in decoding the one or more packets comprises identifying a failure in decoding multiple packets over a period of time defined by a timer, an expiration of which causes the changing of the operating point, and wherein the failure in decoding a respective packet of the multiple packets comprises detecting an error in the respective packet based on one or more parity bits of the respective packet.

Example 19: The method according to any of Examples 14 through 18, comprising: setting a first timer to an initial value and running the first timer for defining a period of time within which to perform the demodulation, the initial value of the first timer being less than a value of a second timer used for transmitter timeout for shutdown of wireless power transfer, and identify the failure in decoding the one or more packets when no packet is correctly decoded within the period of time.

Example 20: The method according to any of Examples 14 through 19, comprising: generating an array of change values for changing the operating point.

Example 21: An apparatus, comprising: transmitter circuitry, the transmitter circuitry including a transmit coil to inductively couple with a receive coil of a wireless power receiver; a controller to: control the transmitter circuitry to generate a wireless power signal in the transmit coil; perform demodulation on a communication signal, modulated over the wireless power signal, in attempt to decode one or more packets from the wireless power receiver; and at least partially responsive to identifying a failure in decoding the one or more packets over a period of time: perturb an operating point by adding a selected one of multiple change values, from an array of change values, to a current value of the operating point; and repeat the controlling of the transmitter circuitry to generate the wireless power signal, at the perturbed operating point, the performing of the demodulation on the communication signal, and the perturbing of the operating point, until one or more packets are decoded.

Example 22: The apparatus according to Example 21, wherein the controller is to: generate the array of change values for perturbing of the operating point.

Example 23: The apparatus according to any of Examples 21 and 22, wherein the array of change values includes randomly-generated values within limits of +/−X %.

Example 24: The apparatus according to any of Examples 21 through 23, wherein the array of change values includes values that decrease in magnitude from a start of the array to an end of the array.

Example 25: The apparatus according to any of Examples 21 through 24, wherein the controller is to: identify a current operating mode to be one of a frequency operating mode or a duty-cycle operating mode; responsive to identifying the current operating mode to be the frequency operating mode, use a first array of change values for changing frequency; and responsive to identifying the current operating mode to be the duty-cycle operating mode, use a second array of change values for changing duty-cycle.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
    transmitter circuitry, the transmitter circuitry including a transmit coil to inductively couple with a receive coil of a wireless power receiver; and
    a controller to:
        control the transmitter circuitry to generate a wireless power signal in the transmit coil for wireless power transfer to the wireless power receiver;
        perform demodulation on a communication signal, modulated over the wireless power signal, in attempt to decode packets from the wireless power receiver;
        set and run a first timer of the controller, the first timer being set to an initial value that defines a period of time;
        perturb an operating point of the transmitter circuitry responsive to identifying a failure in decoding multiple packets from the wireless power receiver over the period of time;
        repeat the controlling of the transmitter circuitry, the performing of demodulation on the communication signal, the setting and running of the first timer, the identifying of the failure in decoding the multiple packets over the period of time, and the perturbing of the operating point, up to a number of times until one or more packets are decoded; and
        use a second timer of the controller for transmitter timeout for shutdown and restart of the wireless power transfer upon failure to correctly decode a packet from the wireless power receiver after repeated perturbings of the operating point, the initial value of the first timer being less than a value used for the second timer.

2. The apparatus of claim 1, wherein the controller is to perform demodulation on the communication signal that is proportional to one or more of: a coil voltage potential of the transmit coil, a coil current of the transmit coil, or an input current provided to the transmitter circuitry by a power supply.

3. The apparatus of claim 1, wherein the multiple packets include a control error packet (CEP) for controlling power level to the wireless power receiver.

4. The apparatus of claim 1, wherein:
    the transmitter circuitry comprises an inverter,
    the controller is to generate a pulse width modulation (PWM) signal to the inverter to generate the wireless power signal in the transmit coil, and
    the operating point comprises a frequency of the generated PWM signal.

5. The apparatus of claim 1, wherein:
    the transmitter circuitry comprises an inverter,
    the controller is to generate a pulse width modulation (PWM) signal to the inverter to generate the wireless power signal in the transmit coil, and
    the operating point comprises a duty-cycle of the generated PWM signal.

6. The apparatus of claim 1, wherein the controller includes:
    multiple demodulation channels to perform the demodulation on the communication signal; and
    a channel selection and data extraction process, the channel selection and data extraction process to provide a decoded data signal and a packet good signal responsive to a packet received and correctly decoded via one of the multiple demodulation channels.

7. The apparatus of claim 1, wherein the failure in decoding the multiple packets from the wireless power receiver over the period of time is responsive to a misalignment between the transmit coil and the receive coil.

8. The apparatus of claim 1, wherein the controller is to: generate an array of change values used for respective perturbations of the operating point.

9. The apparatus of claim 8, wherein the array of change values includes randomly-generated values within limits of +/−X %, or values that decrease in magnitude from a start of the array to an end of the array.

10. The apparatus of claim 1, wherein the controller is to: identify a failure in decoding a respective packet of the multiple packets responsive to detecting an error in the respective packet from a parity check of the respective packet.

11. A method comprising:
at a wireless power transmitter,
causing a wireless power signal to be generated in a transmit coil of the wireless power transmitter which inductively couples with a receive coil of a wireless power receiver for wireless power transfer;
performing demodulation on a communication signal, modulated over the wireless power signal, in attempt to decode packets from the wireless power receiver;
setting and running a first timer of the wireless power transmitter, the first timer being set to an initial value that defines a period of time;
identifying an expiration of the period of time after failing to decode multiple packets from the wireless power receiver over the period of time due to misalignment of the receive coil relative to the transmit coil; and
at least partially responsive to identifying the expiration of the period of time after failing to decode the multiple packets over the period of time:
changing an operating point of the wireless power transmitter; and
repeating the causing of the wireless power signal to be generated, at the changed operating point, and the performing of the demodulation on the communication signal; and
using a second timer for transmitter timeout for shutdown and restart of the wireless power transfer upon failure to correctly decode a packet from the wireless power receiver after repeated changes in the operating point, the initial value of the first timer being less than a value used for the second timer.

12. The method of claim 11, wherein:
causing the wireless power signal to be generated comprises generating a pulse width modulation (PWM) signal to an inverter of the wireless power transmitter, and
the operating point comprises a frequency of the generated PWM signal.

13. The method of claim 11, wherein:
causing the wireless power signal to be generated comprises generating a pulse width modulation (PWM) signal to an inverter of the wireless power transmitter, and
the operating point comprises a duty-cycle of the generated PWM signal.

14. The method of claim 11, wherein the multiple packets includes a control error packet (CEP) for controlling power level to the wireless power receiver.

15. The method of claim 11, wherein the failure in decoding a respective packet of the multiple packets comprises detecting an error in the respective packet from a parity check of the respective packet.

16. The method of claim 11, comprising:
generating an array of change values for respective changings of the operating point.

17. An apparatus, comprising:
transmitter circuitry, the transmitter circuitry including a transmit coil to inductively couple with a receive coil of a wireless power receiver;
a memory;
a controller adapted to control the transmitter circuitry to generate a wireless power signal in the transmit coil for wireless power transfer to the wireless power receiver, the controller adapted to control transmit power of the wireless power transfer in a control loop process based on control error packets received from the wireless power receiver, the controller including a first timer for operating point perturbation and a second timer for shutdown and restart of the wireless power transfer, the controller to:
perform demodulation on a communication signal, modulated over the wireless power signal, in attempt to decode packets from the wireless power receiver;
set the first timer to an initial value and run the first timer, the initial value of the first timer defining a period of time and being less than a value used for the second timer;
at least partially responsive to expiration of the period of time after failing to decode multiple packets from the wireless power receiver over the period of time:
perturb an operating point by adding a selected one of multiple change values, from an array of change values stored in the memory, to a current value of the operating point; and
repeat the controlling of the transmitter circuitry to generate the wireless power signal, at the perturbed operating point, the performing of the demodulation on the communication signal, and the perturbing of the operating point, until one or more packets are decoded; and
at least partially responsive to expiration of the second timer upon failure to correctly decode a packet from the wireless power receiver after repeated perturbings of the operating point:
shut down and restart the wireless power transfer to the wireless power receiver.

18. The apparatus of claim 17, wherein the controller is to: generate and store the array of change values in the memory for the repeated perturbing of the operating point.

19. The apparatus of claim 18, wherein the array of change values includes randomly-generated values within limits of +/−X %.

20. The apparatus of claim 18, wherein the array of change values includes values that decrease in magnitude from a start of the array to an end of the array.

21. The apparatus of claim 17, wherein the controller is to: control the transmitter circuitry to operate in a frequency mode of operation over a frequency band and in a duty-cycle mode of operation upon reaching an upper limit of the frequency band;

identify a current operating mode of the transmitter circuitry to be one of the frequency mode of operation or the duty-cycle mode of operation;

responsive to identifying the current operating mode to be the frequency mode of operation, use a first array of change values for perturbing the operating point by changing frequency; and responsive to identifying the current operating mode to be the duty-cycle mode of operation, use a second array of change values for perturbing the operating point by changing duty-cycle.

22. The apparatus of claim 17, wherein the failure to decode the multiple packets from the wireless power receiver over the period of time is responsive to a misalignment of the receive coil relative to the transmit coil.

* * * * *

UNITED STATES PATENT AND TRADEMARK OFFICE
CERTIFICATE OF CORRECTION

PATENT NO. : 12,444,985 B2
APPLICATION NO. : 18/498272
DATED : October 14, 2025
INVENTOR(S) : Santosh Bhandarkar It is certified that error appears in the above-identified patent and that said Letters Patent is hereby corrected as shown below:

In the Specification

| | | |
|---|---|---|
| Column 7, | Line 16, | change "capacitor C p and a" to --capacitor $C_p$ and a-- |
| Column 7, | Line 21, | change "voltage Vs to H-bridge" to --voltage $V_s$ to H-bridge-- |
| Column 7, | Line 24, | change "coil L R and" to --coil $L_R$ and-- |
| Column 7, | Line 62, | change "potential Vs provided" to --potential $V_s$ provided-- |
| Column 7, | Line 64, | change "voltage Vs is fed" to --voltage $V_s$ is fed-- |
| Column 8, | Line 27, | change "error V error between" to --error $V_{error}$ between-- |
| Column 8, | Line 29, | change "(i.e., + or —) to --(i.e., + or –)-- |
| Column 9, | Lines 60-61, | change "potential $V_{coil}$ at an" to --potential $V_{coil}$, at an-- |
| Column 11, | Line 65, | change "current an input" to --current $I_{coil}$, an input-- |
| Column 12, | Line 36, | change "equals to a (or equivalently," to --equals to a '1' (or equivalently,-- |

Signed and Sealed this
Twenty-fifth Day of November, 2025

John A. Squires
*Director of the United States Patent and Trademark Office*